US007295986B2

(12) United States Patent
Hayakawa

(10) Patent No.: US 7,295,986 B2
(45) Date of Patent: Nov. 13, 2007

(54) INFORMATION PROCESSING APPARATUS AND METHOD, AND RECORDING MEDIUM THEREFOR

(75) Inventor: Koichi Hayakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 883 days.

(21) Appl. No.: 09/756,427

(22) Filed: Jan. 8, 2001

(65) Prior Publication Data
US 2001/0023422 A1    Sep. 20, 2001

(30) Foreign Application Priority Data
Jan. 14, 2000    (JP) ............................ P2000-005561

(51) Int. Cl.
*G06Q 99/00*    (2006.01)
(52) U.S. Cl. ........................... 705/1; 710/300; 710/302
(58) Field of Classification Search .................... 705/1; 707/5; 235/375; 717/120; 710/15, 300, 710/301, 302
See application file for complete search history.

(56) References Cited

U.S. PATENT DOCUMENTS

| | | | | |
|---|---|---|---|---|
| 5,745,036 | A * | 4/1998 | Clare ....................... | 340/572.1 |
| 5,910,776 | A * | 6/1999 | Black ........................ | 340/10.1 |
| 5,949,335 | A * | 9/1999 | Maynard ................. | 340/572.1 |
| 6,321,983 | B1 * | 11/2001 | Katayanagi et al. ........ | 235/380 |
| 2001/0053980 | A1* | 12/2001 | Suliman et al. ................ | 705/1 |

FOREIGN PATENT DOCUMENTS

| | | |
|---|---|---|
| EP | 0 623 900 A1 | 4/1994 |
| EP | 0 756 238 A1 | 4/1995 |
| EP | 1102268 A2 * | 5/2001 |
| WO | WO99/35787 | 7/1999 |

OTHER PUBLICATIONS

Business Wire; Feb. 9, 1993; 'Warrantech Introduces Several New Programs'.*
From wayback machine; www.warrantech.com; anylinkage Nov. 14, 1999.*
"Draft Standard for a High Performance Serial Bus Peer-to-Peer Data Transport Protocol (PPDT)", Prepared by the Microprocessor and Microcomputer Standards Committee of the IEEE Computer Society (Institute of Electrical and Electronics Engineers, Inc.), P1394.3, D2.0, Jul. 2000, pp. 79.

(Continued)

*Primary Examiner*—John G. Weiss
*Assistant Examiner*—Traci L. Casler
(74) *Attorney, Agent, or Firm*—Bell, Boyd & Lloyd LLP

(57) ABSTRACT

By installing a device control module (DCM), a functional component module (FCM), and a guarantee card FCM of a digital video cassette recorder (DVCR) into an integrated receiver decoder (IRD), the IRD is able to control the DVCR. The guarantee card FCM is used for accessing an electronic guarantee card stored in a non-volatile memory of the DVCR. The IRD stores purchase information or repair information of the DVCR into the non-volatile memory of the DVCR via an IEEE-1394 serial bus in response to an instruction from a requester. The IRD also reads the purchase information or the repair information from the non-volatile memory of the DVCR via the IEEE-1394 serial bus.

25 Claims, 20 Drawing Sheets

OTHER PUBLICATIONS

"Draft High Performance Serial Bus Bridges", Prepared by the Microprocessor and Microcomputer Standards Committee of the IEEE Computer Society (Institute of Electrical and Electronics Engineers, Inc.), P1394.1, D0.16, Mar. 2001, pp. 120.

"*The HAVi Specification—Version 1.0 beta*" [Online], Nov. 19, 1998, Searched on Aug. 25, 2004, the Internet <URL: http://www.wv.informatik.uni-erlangen.de/bdludwig/embassi/havi/havi10b.pdf>.

* cited by examiner

PURCHASE INFORMATION SUCCESSFULLY WRITTEN.

PURCHASE INFORMATION ALREADY WRITTEN CANNOT ACCESS.

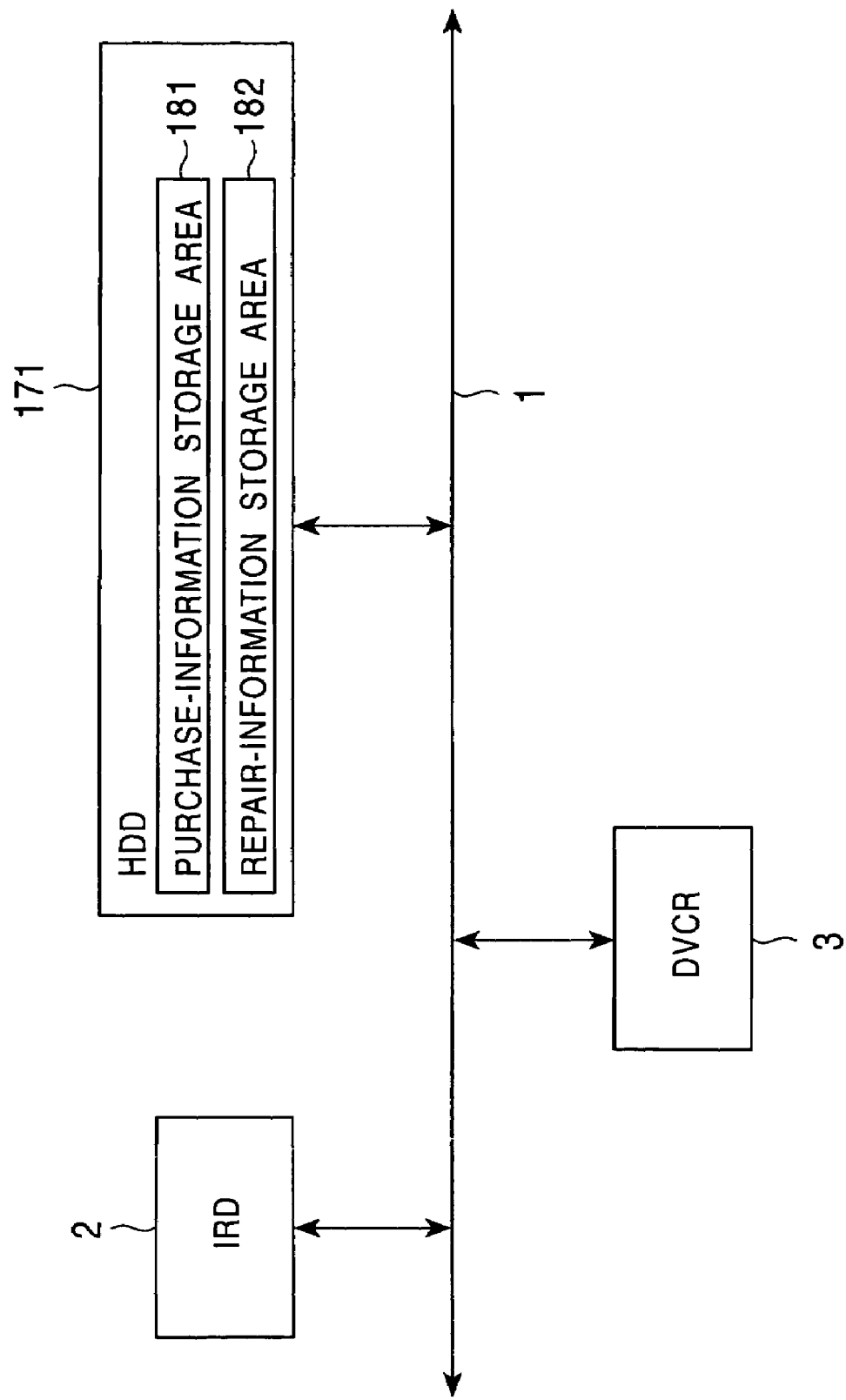

INFORMATION PROCESSING APPARATUS AND METHOD, AND RECORDING MEDIUM THEREFOR

BACKGROUND OF THE INVENTION

1. Field of the Invention

The present invention generally relates to information processing apparatuses and methods, and recording media therefore. More particularly, the invention relates to an information processing apparatus and method for storing, for example, information concerning purchase and repair information of electronic apparatuses, and to a recording medium for storing a program implementing the above-described method.

2. Description of the Related Art

In a home network system using, for example, an IEEE-1394serial bus, a plurality of electronic apparatuses, such as an integrated receiver decoder (IRD) and a digital video cassette recorder (DVCR) are connected to each other, and information is transmitted and received therebetween, thereby reading or recording images or sound information. In the IEEE-1394 serial bus, one electronic apparatus controls other electronic apparatuses by sending an audio video/control (AV/C) command to them.

As middleware which hides the AV/C command from various types of application software, the home audio/video interoperability architecture (HAVi) (trademark) is known. According to the HAVi, electronic apparatuses are controlled by a device control module (DCM).

When such electronic apparatuses break down, they need repairing. Normally, a guarantee card is attached to an electronic apparatus in order to guarantee failures occurring during a predetermined period after purchasing the apparatus. A repair technician checks the guarantee card and repairs the defect free of charge if the failure has occurred within the predetermined guarantee period.

However, it is troublesome to keep the guarantee card and it is also easy to lose it. If the guarantee card is lost, the user has to pay for the services, even within the guarantee period.

Accordingly, for managing electronic apparatuses, a special writer may be used for recording repair information and guarantee-card information in the electronic apparatuses, and a special reader may be used for reading the information from the electronic apparatuses.

In order to implement such a technique, however, it is necessary to connect the electronic apparatus to the special reader/writer so as to transmit and receive information. Additionally, it is necessary for the repair technician to bring the special reader/writer every time the electronic apparatus is repaired, which is troublesome.

SUMMARY OF THE INVENTION

Accordingly, in view of the above background, it is an object of the present invention to make the management of guarantee cards easy by storing purchase and repair information of electronic apparatuses and reading such information from the apparatuses without requiring a special reader/writer.

In order to achieve the above object, according to one aspect of the present invention, there is provided an information processing apparatus for sending and receiving an information signal to and from an electronic apparatus. The information processing apparatus includes a control-information acquiring unit for acquiring, from the electronic apparatus, control information used for writing or reading product history information which includes at least one of purchase information and repair information concerning the electronic apparatus. A control-information identification/storage unit identifies the control information acquired by the control-information acquiring unit and stores the acquired control information therein. A product-history updating unit updates the product history information stored in the electronic apparatus based on the control information stored in the control-information identification/storage unit.

In the aforementioned information processing apparatus, the information signal may be sent and received via a network system. In this case, the network system may include an IEEE-1394 serial bus.

The aforementioned information processing apparatus may further include a product-history storage unit. In this case, the product history information may be read from the electronic apparatus based on the control information stored in the control-information identification/storage unit, and may be stored in the product-history storage unit.

The aforementioned information processing apparatus may further include: an apparatus-identification-number reading unit for reading an apparatus identification number of the electronic apparatus from the electronic apparatus; and a central storage unit for centrally storing the product history information stored in the product-history storage unit together with the apparatus identification number of the electronic apparatus into an external electronic apparatus.

The aforementioned information processing apparatus may further include a product-history reading unit for reading the product history information of the electronic apparatus from the product history information stored in the external electronic apparatus by the central storage unit based on the apparatus identification number of the electronic apparatus.

The above-described product history updating unit may further include a product-history display unit. The product history information may be read from the electronic apparatus based on the control information and may be displayed by the product-history display unit.

The aforementioned product history updating unit may further include a product-history input unit for inputting new product history information concerning the electronic apparatus from an external source based on the product history information displayed by the product-history display unit.

The above-described control-information acquiring unit may acquire the control information from the electronic apparatus when a communication connection with the electronic apparatus is established.

The information processing apparatus may further include a purchase-information determining unit for determining whether the purchase information has already been written into the electronic apparatus. In this case, the product-history updating unit may not write new purchase information into the electronic apparatus when the purchase-information determining unit determines that the purchase information has already been written.

The above-described product-history updating unit may not overwrite the repair information concerning the electronic apparatus.

The above-described purchase information may include at least one of the date on which the electronic apparatus was purchased, the name, the address, and the telephone number of a store at which the electronic apparatus was purchased, and a digital signature of the store.

The above-described repair information may include at least one of the date on which the electronic apparatus was repaired, the item and the type of repair, a contact number, the name of a repair company, and information concerning a repair person.

According to another aspect of the present invention, there is provided an information processing method for use in an information processing apparatus for sending and receiving an information signal to and from an electronic apparatus. The information processing method include: a control-information acquiring step of acquiring, from the electronic apparatus, control information used for writing or reading product history information which includes at least one of purchase information and repair information concerning the electronic apparatus; a control-information identification/storage step of identifying the control information acquired in the control-information acquiring step and of storing the acquired control information therein; and a product:-history updating step of updating the product history information stored in the electronic apparatus based on the control information stored in the control-information identification/storage step.

According to still another aspect of the present invention, there is provided a recording medium for storing a computer-readable program which controls an information processing apparatus for sending and receiving an information signal to and from an electronic apparatus. The computer-readable program includes: a control-information acquiring step of acquiring, from the electronic apparatus, control information used for writing or reading product history information which includes at least one of purchase information and repair information concerning the electronic apparatus; a control-information identification/storage step of identifying the control information acquired in the control-information acquiring step and of storing the acquired control information therein; and a product-history updating step of updating the product history information stored in the electronic apparatus based on the control information stored in the control-information identification/storage step.

According to the foregoing information processing apparatus and method, and the program stored in the recording medium, the control information used for reading or writing the product history information including at least one of the purchase information and the repair information concerning the electronic apparatus is acquired from the electronic apparatus. The acquired control information is then stored, and based on the control information, the product history information stored in the electronic apparatus is updated. It is thus possible to easily manage an electronic guarantee card without installing a guarantee FCM in advance.

According to a further aspect of the present invention, there is provided an information processing apparatus for sending and receiving an information signal to and from an external information processing apparatus. The information processing apparatus includes a control-information storage unit for storing control information used for writing or reading product history information which includes at least one of purchase information and repair information concerning the information processing apparatus. A product-history storage unit stores the product history information to be updated by an instruction from the external information processing apparatus. A control-information sending unit sends the control information stored in the control-information storage unit to the external information processing apparatus in response to a request from the external information processing apparatus.

In the aforementioned information processing apparatus, the control signal may be sent and received via a network system. In this case, the network system may include an IEEE-1394 serial bus.

The aforementioned information processing apparatus may further include an apparatus-identification-number storage unit for storing an apparatus identification number of the information processing apparatus. In this case, in response to an instruction from the external information processing apparatus, the apparatus identification number may be read from the apparatus-identification-number storage unit, and the stored product history information may be read from the product-history storage unit.

The aforementioned information processing apparatus may further include a product-history display unit for displaying the product history information stored in the product-history storage unit.

The above-described control-information sending unit may send the control information to the external information processing apparatus when a communication connection with the external information processing apparatus is established.

The above-described purchase information may include at least one of the date on which the information processing apparatus was purchased, the name, the address, and the telephone number of a store at which the information processing apparatus was purchased, and a digital signature of the store.

The above-described repair information may include at least one of the date on which the information processing apparatus was repaired, the item and the type of repair, a contact number, the name of a repair company, and information concerning a repair person.

According to a yet further aspect of the present invention, there is provided an information processing method for use in an information processing apparatus for sending and receiving an information signal to and from an external information processing apparatus. The information processing method includes: a control-information storage step of storing control information used for writing or reading product history information which includes at least one of purchase information and repair information concerning the information processing apparatus; a product-history storage step of storing the product history information to be updated by an instruction from the external information processing apparatus; and a control-information sending step of sending the control information stored in the control-information storage step to the external information processing apparatus in response to a request from the external information processing apparatus.

According to a further aspect of the present invention, there is provided a recording medium for storing a computer-readable program which controls an information processing apparatus for sending and receiving an information signal to and from an external information processing apparatus. The computer-readable program includes: a control-information storage step of storing control information used for writing or reading product history information which includes at least one of purchase information and repair information concerning the information processing apparatus; a product-history storage step of storing the product history information to be updated by an instruction from the external information processing apparatus; and a control-information sending step of sending the control information stored in the control-information storage step to the external information processing apparatus in response to a request from the external information processing apparatus.

According to the foregoing information processing apparatus and method, and the program stored in the recording medium, the control information for writing or reading the product history information including at least one of the purchase information and the repair information concerning the information processing apparatus is stored. Then, the product history information to be updated by an instruction from an external information processing apparatus is stored. Based on a request from the external information processing apparatus, the stored control information is sent to the external information processing apparatus. The electronic guarantee card can thus be easily managed.

BRIEF DESCRIPTION OF THE DRAWINGS

FIG. 21 is a block diagram illustrating a network system according to still another embodiment of the present invention.

DESCRIPTION OF THE PREFERRED EMBODIMENTS

Figure 1:
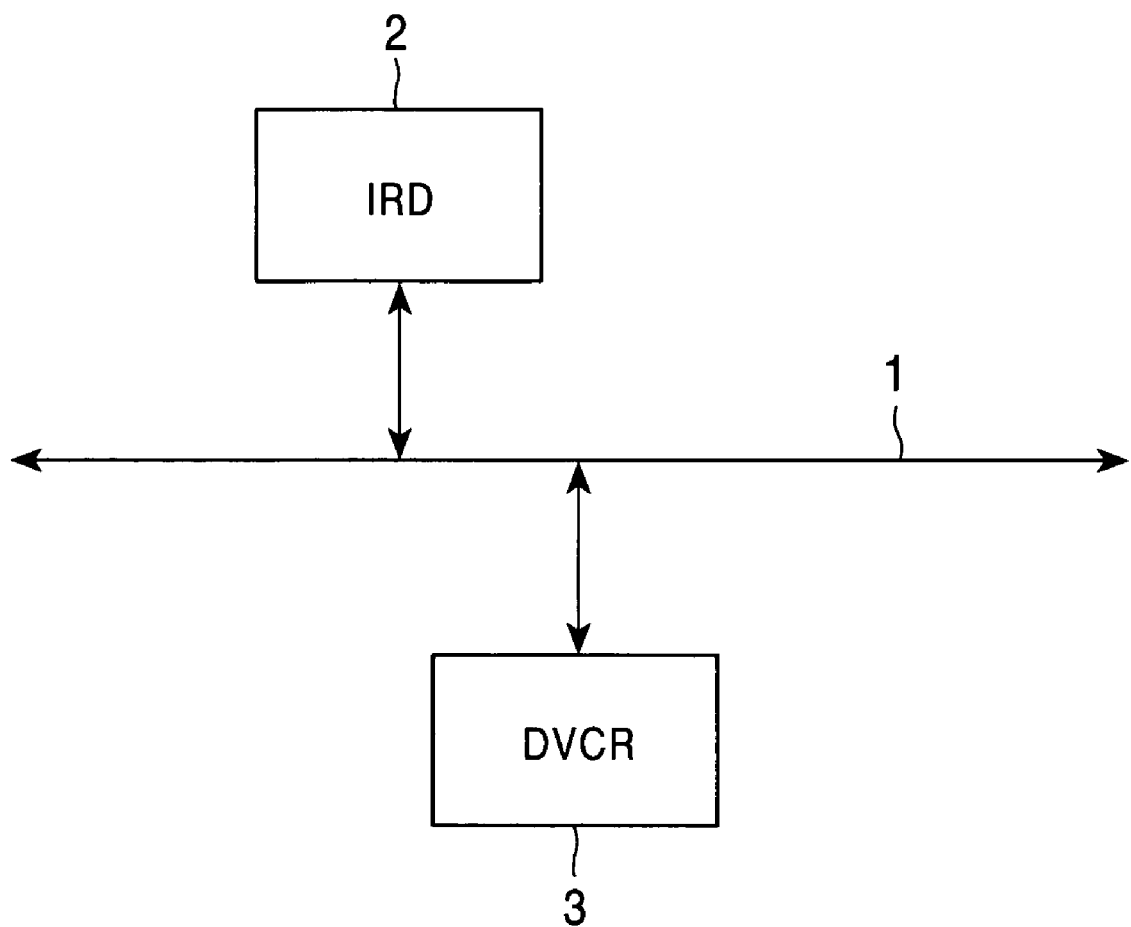
FIG. 1 is a block diagram illustrating the configuration of a network system according to an embodiment of the present invention.

Referring to the block diagram of FIG. 1, a home network system configured in accordance with an embodiment of the present invention is formed of an IRD 2 and a DVCR 3. The IRD 2 and the DVCR 3 are connected to an IEEE-1394 serial bus 1. When being connected to the IEEE-1394 serial bus 1, the DVCR 3 sends a device control module (DCM) and a functional component module (FCM), which will be discussed below, to the IRD 2 via the IEEE-1394 serial bus 1. The IRD 2 detects the state of the apparatuses connected to the IEEE-1394 serial bus 1 from the received information (DCM and FCM), and displays a graphical user interface (GUI) for controlling such apparatuses on a built-in liquid crystal display (LCD) 29 shown in FIG. 2.

The user operates a touch panel 28 (FIG. 2) provided for the IRD 2 based on the display of the LCD 29 so as to instruct the DVCR 3 connected to the IEEE-1394 serial bus 1 to execute processing. In response to the user's instruction, the IRD 2 generates a control signal and supplies it to the DVCR 3 via the IEEE-1394 serial bus 1. Upon receiving the control signal, the DVCR 3 performs processing, such as recording or playing back images or sound.

Figure 2:
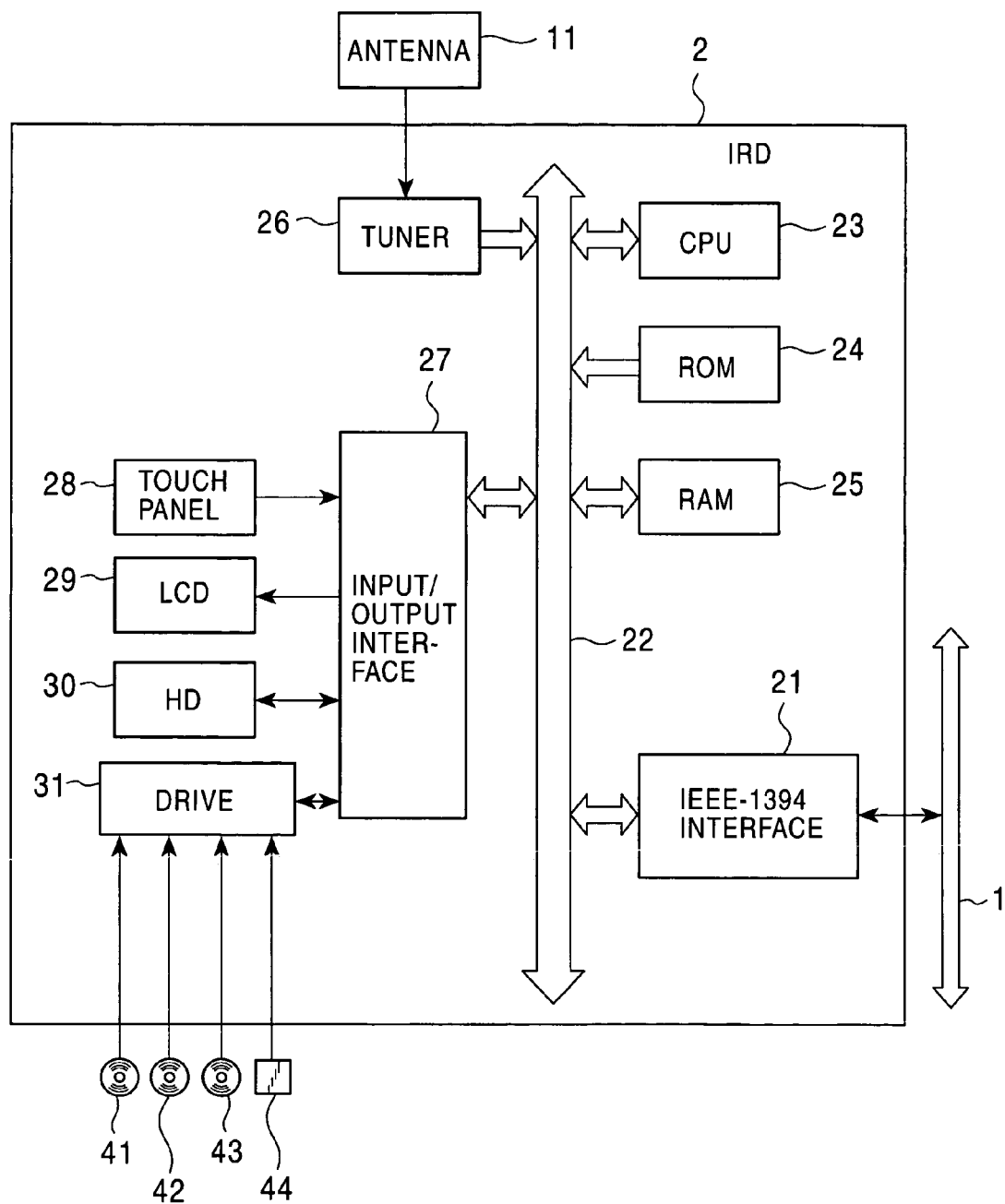
FIG. 2 is a block diagram illustrating an example of the configuration of an IRD shown in FIG. 1.

The IRD 2 is configured, for example, as shown in FIG. 2. A signal transmitted from the DVCR 3 is input into a central processing unit (CPU) 23 via the IEEE-1394 serial bus 1, an IEEE-1394 interface 21, and an internal bus 22. When the touch panel 28 is operated by the user, the corresponding signal is also input into the CPU 23 via an input/output interface 27 and the internal bus 22. The touch panel 28 can be operated according to a message (GUI) displayed on the LCD 29. The IRD 2 may be remotely controlled by a remote controller (not shown) rather than being operated through the touch panel 28.

The CPU 23 reads a program stored in a read only memory (ROM) 24 or a hard disk 30 and executes it according to the received signal. The CPU 23 then outputs the processing result to the LCD 29 via the input/output interface 27 and displays it on the LCD 29 as required. The CPU 23 also generates character/image data representing, for example, a message for assisting the user's operation, outputs it to the LCD 29 via the internal bus 22 and the input/output interface 27, and displays it on the LCD 29. Additionally, the CPU 23 generates et control signal for controlling the DVCR 3 and transmits it to the DVCR 3 via the internal bus 22, the IEEE-1394 interface 21, and the IEEE-1394 serial bus 1. A random access memory (RAM) 25 temporarily stores a program executed by the CPU 23, data created by the execution of the program, data required for executing processing by the DVCR 3, etc.

An antenna 11 supplies received satellite broadcast signals to a tuner 26 of the IRD 2. The tuner 26 selects and receives a signal of the broadcast channel instructed by the CPU 23 from among the satellite broadcast signals received from the antenna 11. In the hard disk 30, various types of application and middleware executed by the CPU 23 are stored. A magnetic disk 41, an optical disc 42, a magneto-optical disk 43, and a semiconductor memory 44 may be loaded in a drive 31.

Figure 3:
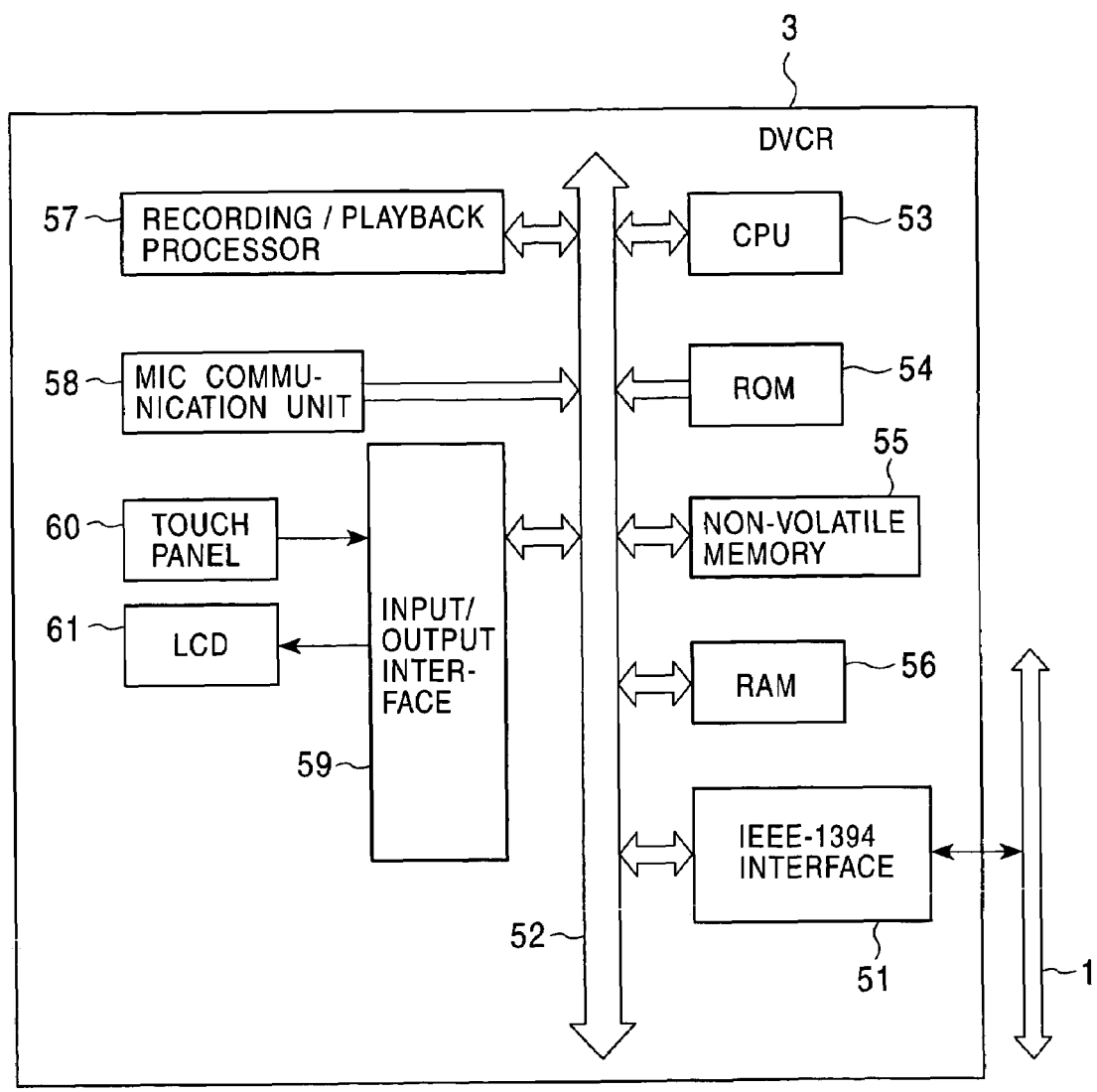
FIG. 3 is a block diagram illustrating an example of the configuration of a DVCR shown in FIG. 1.

FIG. 3 is a block: diagram illustrating the internal configuration of the DVCR 3. A signal transmitted from the IRD 2 is input into a CPU 53 via the IEEE-1394 serial bus 1, an IEEE-1394 interface 51, and an internal bus 52. By the user's operation on a touch panel 60, the corresponding signal is also input into the CPU 53 via an input/output interface 59 and the internal bus 52.

The CPU 53 reads and executes a program stored in a ROM 54 based on a received signal so as to output a control signal to, for example, a recording/playback processor 57 via the internal bus 52, and also sends the DCM and FCM stored in the ROM 54 to the IRD 2 via the internal bus 52, the IEEE-1394 interface 51, and the IEEE-1394 serial bus 1.

Figure 4:
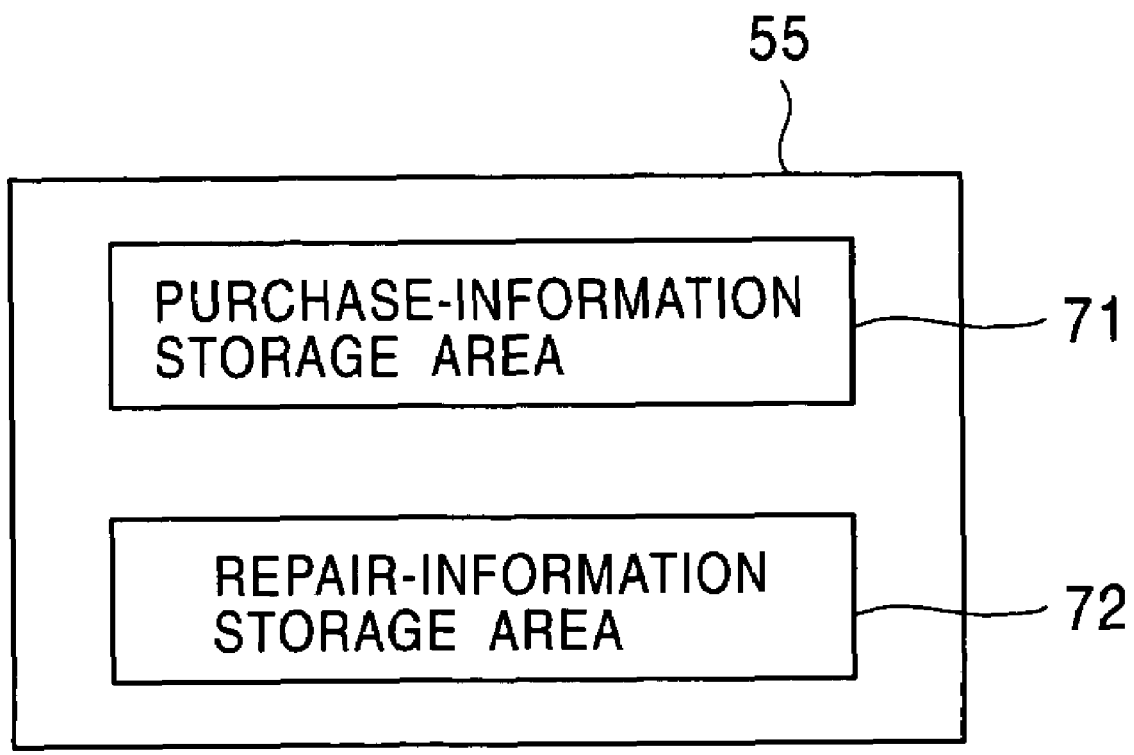
FIG. 4 illustrates the internal configuration of a non-volatile memory shown in FIG. 3.

A non-volatile memory 55 is formed of, for example, electrically erasable and programmable read only memory (EEPROM), and includes a purchase-information storage area 71 and a repair-information storage area 72, as shown in FIG. 4. The purchase-information storage area 71 stores purchase information (the date on which and the store where the DVCR 3 was purchased (hereinafter referred to as the "purchase date and purchase store"), and a digital signature of the purchase store), while the repair-information storage area 72 stores a plurality of items of repair information (the date on which and the store where the DVCR 3 was repaired (hereinafter referred to as the "repair date and repair store"), repair technician's name, contact number, repair company, etc.). The RAM 56 temporarily stores a program to be executed by the CPU 53, data created by the execution of the program, data required for executing the processing by the DVCR 3, etc.

The recording/playback processor 57 reads data recorded on a medium (in this example, a video cassette tape, which is not shown) loaded in the DVCR 3 according to the signal received via the CPU 53. The recording/playback processor 57 then returns the data to the IRD 2 via the internal bus 52, the IEEE-1394 interface 51, and the IEEE-1394 serial bus 1, or outputs it to an LCD 61 via the internal bus 52 and the input/output interface 59 and displays it on the LCD 61. The recording/playback processor 57 also records data transmitted from the IRD 2 via the IEEE-1394 serial bus 1, the IEEE-1394 interface 51, and the internal bus 52 on the video cassette tape (not shown) loaded in the DVCR 3.

A memory in cassette (MIC) communication unit 58 communicates with a MIC, for example, a semiconductor memory or a Memory Stick (trademark), stored in the video cassette tape inserted into the DVCR 3 so as to detect information recorded on the MIC. The MIC stores an ID (ID number) unique to the video cassette tape. By reading the ID recorded on the MIC via the internal bus 52, the CPU 53 is able to identify a new cassette tape loaded in the DVCR 3. The ID recorded in the MIC is also read into the IRD 2 via the internal bus 52, the IEEE-1394 interface 51, and the IEEE-1394 serial bus 1. This enables the IRD 2 to identify the video cassette tape inserted into the DVCR 3.

To perform the operation by the apparatuses on the network shown in FIG. 1 in association with each other, middleware for controlling and managing the network is required. The middleware is positioned between an operating system (OS), a network control program, or lower software, such as a database system, and upper application software, so as to provide various services to the application software. When apparatuses produced by different manufactures are connected to the network, common standards to which the middleware should conform are also required for the accurate operation of the network and the mutual operation of the apparatuses. In this embodiment, the HAVi is used as the middleware for controlling and managing the network, and a network system implementing this HAVi is discussed below.

Figure 5:
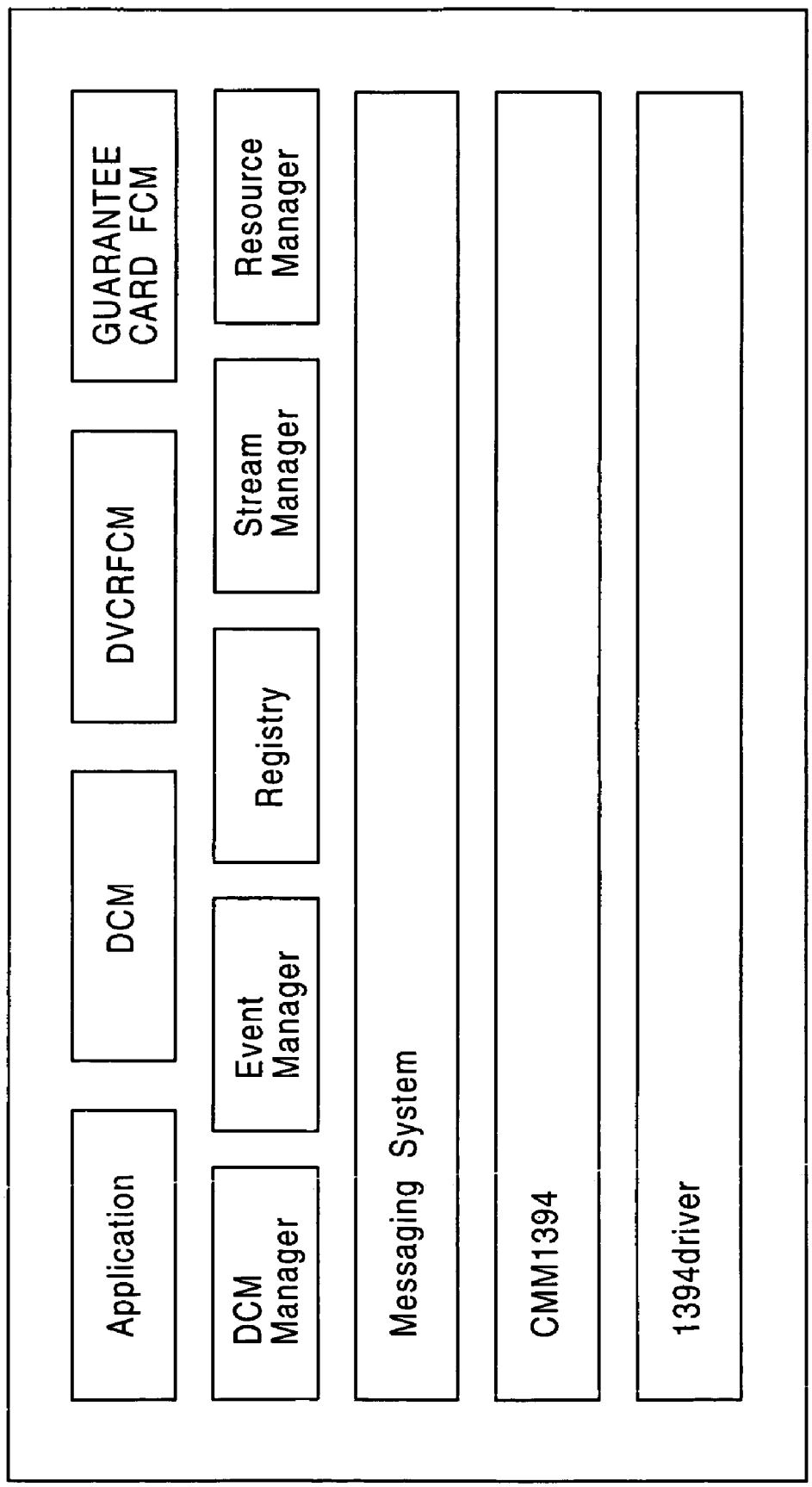
FIG. 5 illustrates a software stack stored in a hard disk shown in FIG. 2.

FIG. 5 illustrates an example of a software stack stored in the hard disk 30 of the IRD 2 shown in FIG. 2. In FIG. 5, modules located at the upper portion are positioned in higher layers than the other modules. The modules other than a 1394 driver and an application are software modules corresponding to the HAVi.

The 1394 driver is a module which describes portions dependent on the IEEE-1394 serial bus 1, and provides a common procedure to the higher software modules for accessing devices. Communication media manager (CMM)-1394 serves as an interface for connecting the IEEE-1394 serial bus 1 with the HAVi software modules and the application. The CMM1394 provides a transmission mechanism for transmitting and receiving signals between the apparatuses connected to the IEEE-1394 serial bus 1. The CMM1394 thus monitors the operation status of the IEEE-1394 serial bus 1 and provides the corresponding information to the other software modules.

A messaging system serves as an application programming interface (API) for the communication between the software modules of the apparatuses on the network, so as to send messages between the software modules. Accordingly, on the network using the HAVi, the sender and the receiver are able to send and receive messages without being aware where they are placed on the network.

A DCM manager installs a DCM, a DVCRFCM, and a guarantee card FCM, which are discussed below, on each apparatus on the network. On the network using the HAVi, when a new apparatus is connected to the network, the DCM manager installs the DCM, the DVCRFCM, and the guarantee card FCM corresponding to the new apparatus, and when an apparatus is disconnected from the network, the DCM manager uninstalls the DCM, the DVCRFCM, and the guarantee card FCM corresponding to the disconnected apparatus.

An event manager is used for generating an event and sending it to another software module when the status of the network changes, such as when a new apparatus is connected to or disconnected from the network. Accordingly, in the network using the HAVi, plug-and-play can be implemented.

A registry stores or updates information concerning apparatuses, such as the type of apparatuses connected to the network, or the type of functions possessed by the apparatuses, and achieves interactivity between different types of apparatuses. An application program obtains required information from this registry. By referring to the registry, each apparatus on the network is able to check where the basic software modules of the other apparatuses are located on the network.

A stream manager monitors and manages the flow of stream data (sequential data), such as images and sound, on the network, and enables real time transmission of the stream data. The stream manager also manages the connection between components of the apparatus and the connection between the apparatuses, and retains and opens network resources and also provides information of the connection state of the entire network. Additionally, the stream manager supports the re-connection of apparatuses after resetting the bus of the network.

A resource manager monitors the network so as to handle a conflict problem for the right to use devices, manage scheduled events, such as events reserved in the connected apparatuses, and check whether there is no apparatus disconnected after being registered.

The application controls and manages a guarantee card FCM for controlling the apparatuses connected to the network. This guarantee card FCM is used for reading the electronic guarantee card (purchase information or repair information) of the corresponding apparatus and writing data into the electronic guarantee card. Details of the guarantee card are described below.

The DCM, which is installed from the DVCR 3, is used for controlling the apparatuses. An application program controls each apparatus connected to the network via the corresponding DCM rather than directly controlling the apparatus. The DVCRFCM is installed from the DVCR 3, and represents the content (function) of the control to be executed on each apparatus by the application program. The DVCRFCM sends an AV/C command to the apparatus designated by the DCM.

The guarantee card FCM, which is installed by the DVCR 3, is used for accessing the electronic guarantee card (purchase information or repair information) stored in the non-volatile memory 55. The guarantee card FCM represents the content (function) of access made to the electronic guarantee card of each apparatus by the application program, and sends an AV/C command designated by the DCM, as in the DVCRFCM.

The DCM, the DVCRFCM, and the guarantee card FCM serve as APIs, and thus, it is not necessary for the application program to consider the difference between the types of apparatuses. Accordingly, in the network using the HAVi, an apparatus on the network is able to identify the functions of the other apparatuses connected to the network so that it is able to remotely operate the other apparatuses.

The individual software modules of the software stack shown in FIG. 5 are read from the hard disk 30 to the RAM 25 and are executed by the CPU 23, though a description thereof is not given.

The above-described software modules are possessed by each apparatus connected to the network according to the class of the apparatus designated by the HAVi. In the HAVi, the following four classes are defined.

A full AV device (FAV) corresponds to an apparatus having a network managing function, and includes all the HAVi software modules (FAV may not possess a DCM, a DVCRFCM, and a guarantee card FCM, but such modules may be installed from a base AV device (BAV), which is described below). The FAV is able to execute an application using Java (trademark), which employs HAVi byte code. Accordingly, the FAV is able to possess the DCMs, the FCMs, and the guarantee card FCMs of the other apparatuses so that they are operated under the control of the FAV.

As in the FAV, an intermediate AV device (IAV) corresponds to an apparatus having a network managing function. However, unlike the FAV, the IAV contains DCMs, FCMs, and guarantee card FCMs of the other apparatuses since it is unable to execute an application using Java, which employs HAVi byte code.

A base AV device (BAV) corresponds to a controlled apparatus which can be directly connected to a network using the HAVi, and possesses a DCM, a FCM, and a guarantee card FCM of its own.

A legacy AV device (LAV) corresponds to an apparatus whose function is limited to being connectable to the IEEE-1394serial bus 1. However, since the LAV responds to an AV/C command, it can be operated as a controlled apparatus as well as being operated singly.

In the present invention, it is assumed that the IRD 2 is an FAV (IEEE-1394 interface 21 corresponds to the 1394driver and the CMM1394 shown in FIG. 5) and the DVCR 3 is a BAV.

Figure 6:
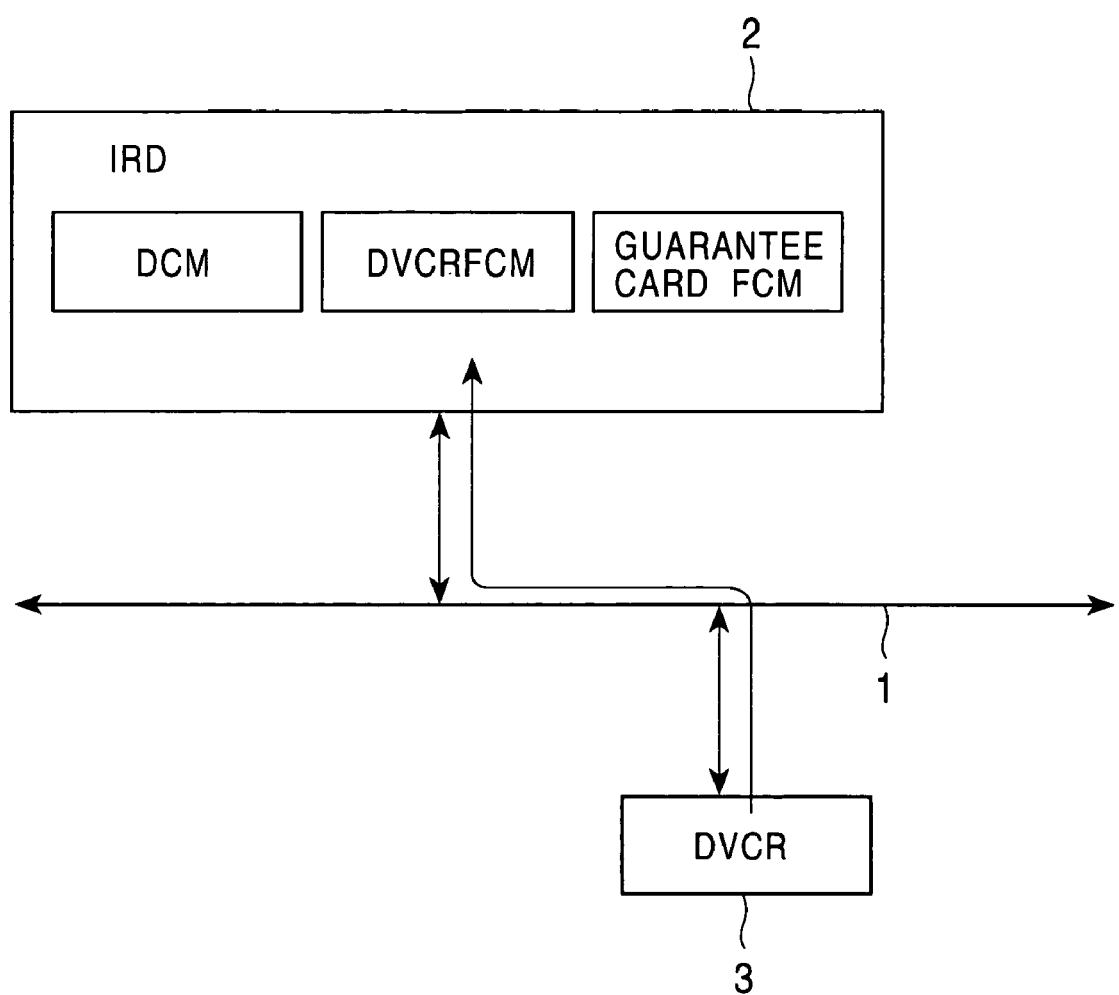
FIG. 6 illustrates the installing operation of a device control module (DCM), a functional component module (FCM), and a guarantee card FCM.

By installing the DCM, the DVCRFCM, and the guarantee card FCM of the DVCR 3, which is a BAV, as shown in FIG. 6, the IRD 2, which is a FAV, is able to operate the DVCR 3 under the control of the IRD 2.

Figure 7:
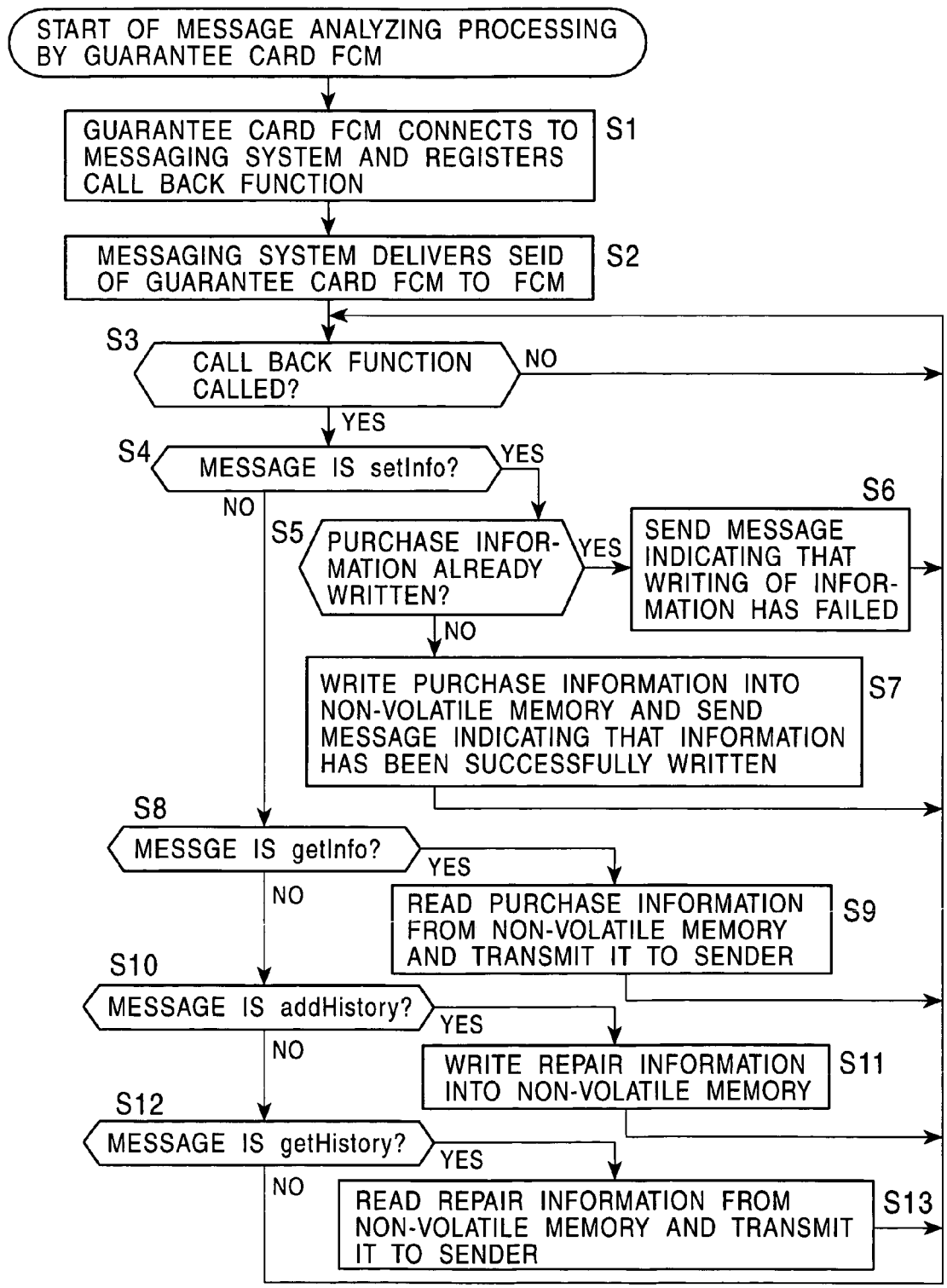
FIG. 7 is a flow chart illustrating message analyzing processing to be executed by the guarantee card FCM.

A description is given below, with reference to the flow chart of FIG. 7, of the message analyzing processing executed by the guarantee card FCM installed in the IRD 2.

In step S1, a guarantee card FCM connects to the messaging system, and registers a call back function. In step S2, the messaging system delivers ID information (SEID) of the guarantee card FCM to the guarantee card FCM.

Upon receiving the SEID from the messaging system, in step S3, the guarantee card FCM determines whether the call back function is called by the application. If not, it waits for the call back function to be called by the application. If it is found in step S3 that the call back function is called, the process proceeds to step S4 in which the guarantee card FCM analyzes a message from the application. More specifically, it is determined in step S4 whether the analyzed message indicates setInfo. If so, the guarantee card FCM outputs the AV/C command corresponding to setInfo to the DVCR 3 via the internal bus 22, the IEEE-1394interface 21, and the IEEE-1394 serial bus 1, and the process then proceeds to step S5.

In step S5, by referring to the purchase-information storage area 71 of the non-volatile memory 55 of the DVCR 3, the guarantee card FCM determines whether purchase information of the DVCR 3 has already been written into the purchase-information storage area 71. If so, the process proceeds to step S6 in which the guarantee card FCM sends a message to the sender (application) indicating that the writing of the purchase information has failed. The guarantee card FCM then returns to step S3, and repeats the above-described processing.

If it is found in step S5 that purchase information of the DVCR 3 has not been written into the purchase-information storage area 71, the process proceeds to step S7. In step S7, the guarantee card FCM writes purchase information of the DVCR 3 into the purchase-information storage area 71 of the non-volatile memory 55, and sends a message to the sender indicating that the purchase information has been successfully written. The guarantee card FCM then returns to step S3, and repeats the above-described processing.

If it is found in step S4 that the analyzed message does not indicate setInfo, the process proceeds to step S8 in which the guarantee card FCM further determines whether the analyzed message indicates getInfo. If so, the process proceeds to step S9 in which the guarantee card FCM reads the purchase information from the purchase-information storage area 71 of the non-volatile memory 55 and sends it to the sender. The process then returns to step S3, and the aforementioned processing is repeated.

If it is found in step S8 that the analyzed message does not indicate getInfo, the process proceeds to step S10 in which the guarantee card FCM further determines whether the analyzed message indicates addHistory. If so, the process proceeds to step S11 in which the guarantee card FCM writes repair information of the DVCR 3 into the repair-information storage area 72 of the non-volatile memory 55. Then, the process returns to step S3, and the aforementioned processing is repeated.

If it is determined in step S10 that the analyzed message does not indicate addHistory, the process proceeds to step S12 in which the guarantee card FCM further makes a determination as to whether the analyzed message indicates getHistory. If so, the process proceeds to step S13 in which the guarantee card FCM reads repair information from the repair-information storage area 72 of the non-volatile memory 55 and sends it to the sender. The process returns to step S3, and the above-described processing is repeated.

If it is found in step S12 that the analyzed message does not indicate getHistory, the process returns to step S3, and the above-described processing is repeated.

Figure 8:
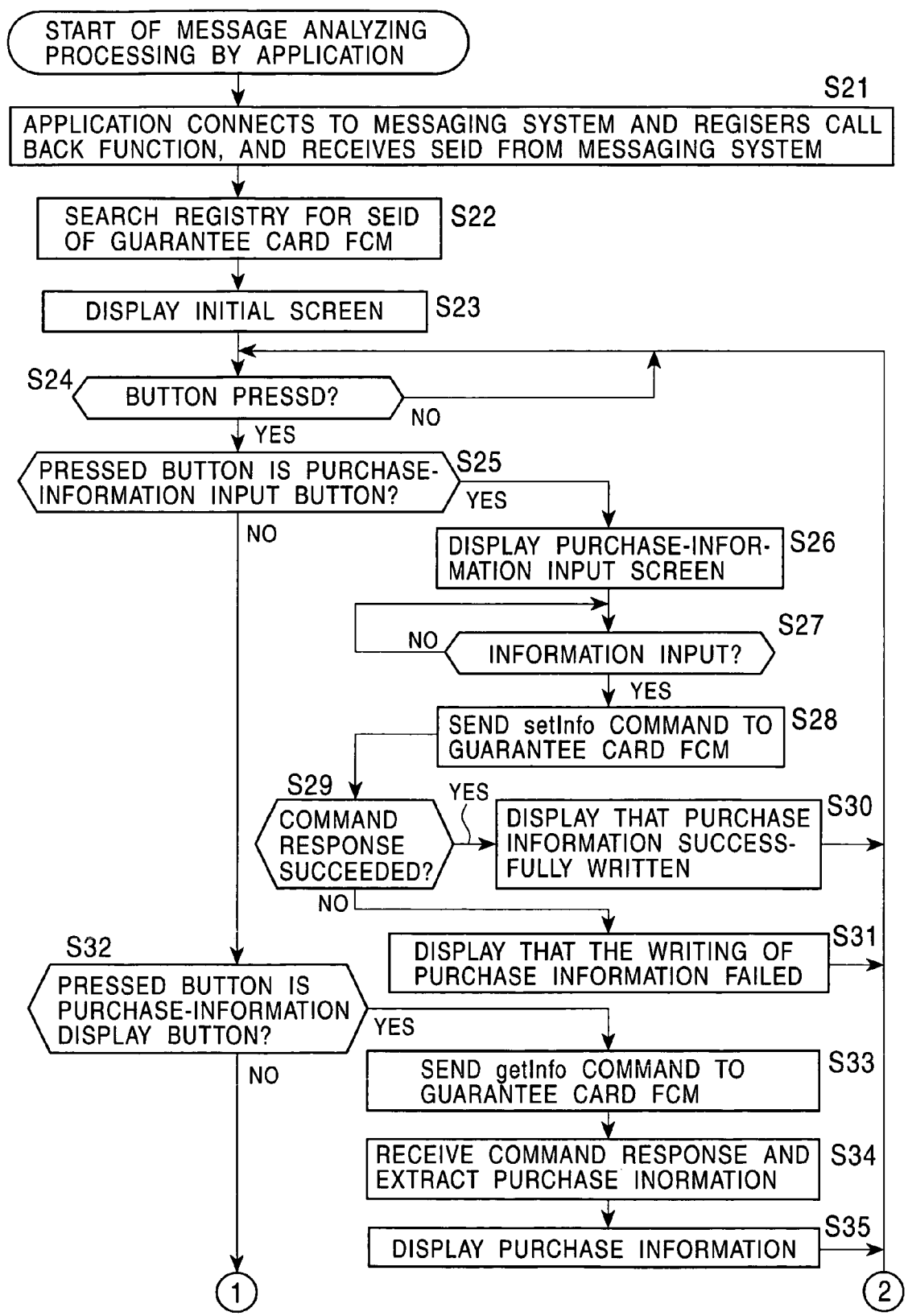
FIGS. 8 and 9 are a flow chart illustrating message analyzing processing to be executed by an application.
Figure 9:
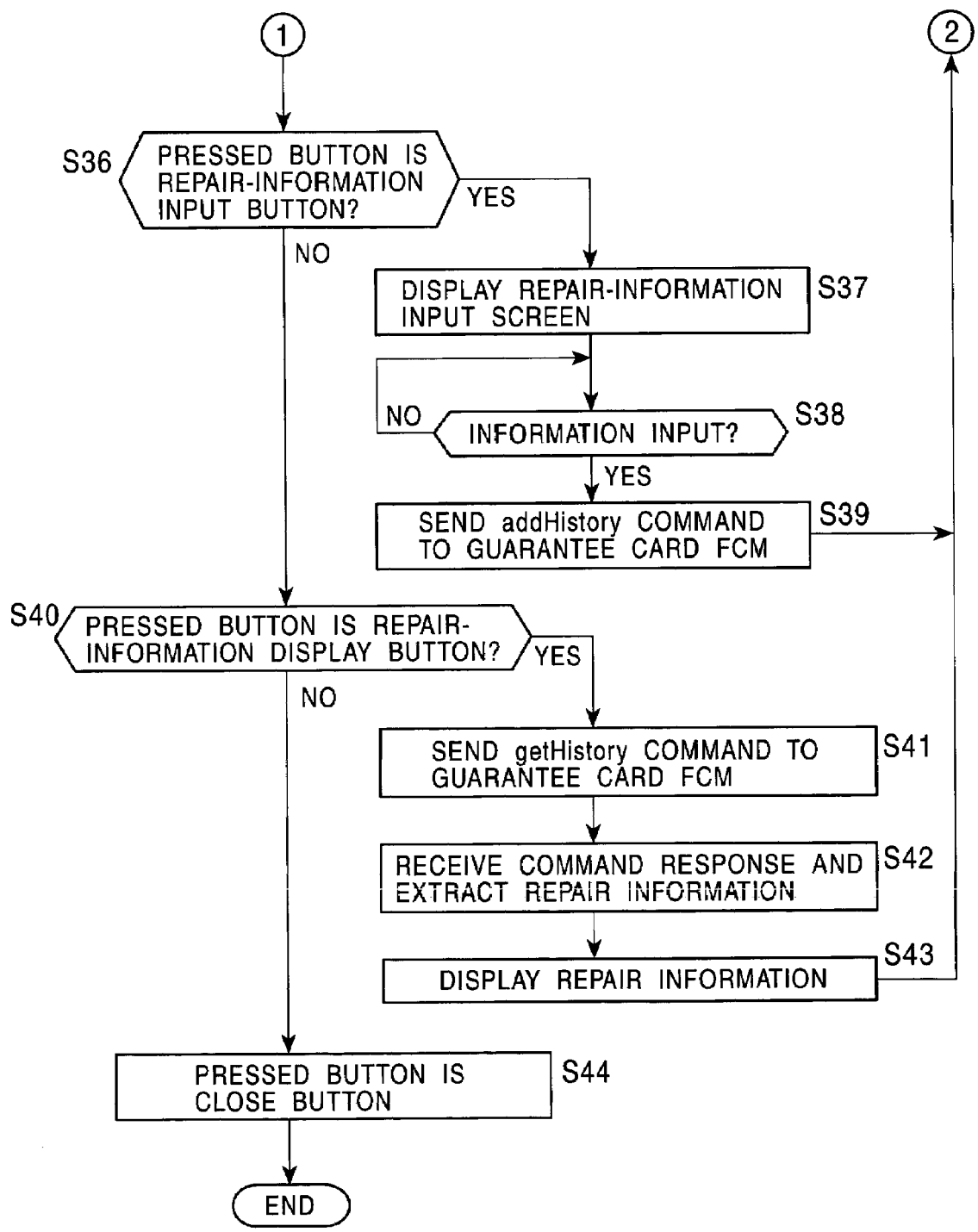

A description is now given of the message analyzing processing executed by the application of the IRD 2 with reference to the flow chart of FIGS. 8 and 9. The DVCR 3 has already been connected to the network, and this processing is started when the requester (user) inputs an instruction to access the electronic guarantee card stored in the non-volatile memory 55 of the DVCR 3.

In step S21, the application connects to the messaging system and registers a call back function, and then receives a SEID of the IRD 2 from the messaging system.

Figure 10:
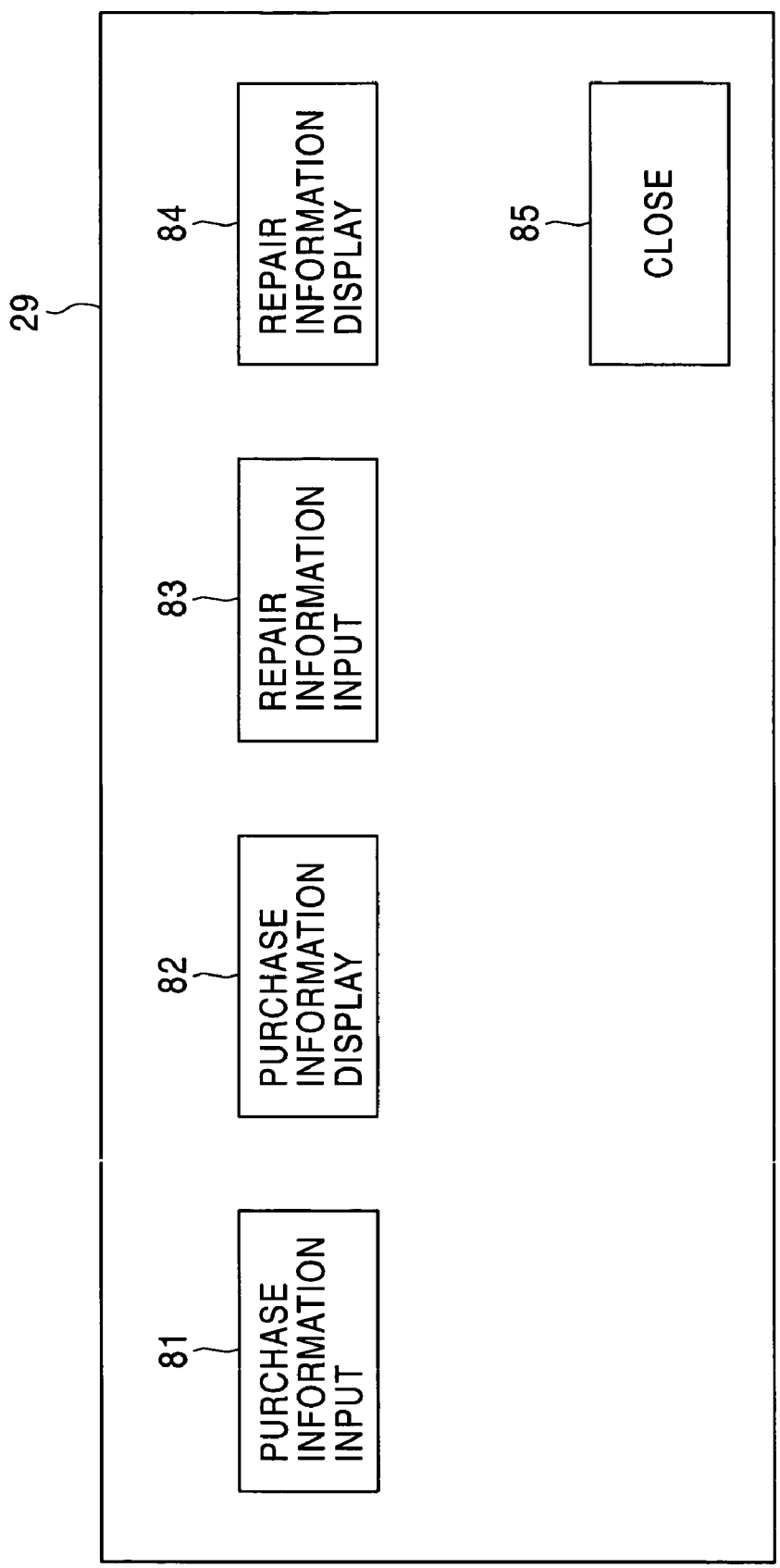
FIG. 10 illustrates a graphical user interface (GUI) displayed on a liquid crystal display (LCD) 29 shown in FIG. 2.

In step S22, the application searches the registry for the SEID of the guarantee card FCM. In step S23, the application displays the initial screen for sending a command to the guarantee card FCM having the SEID searched for in step S22. Then, a GUI, such as the one shown in FIG. 10, is displayed.

The application determines in step S24 whether any one of the buttons, such as a purchase-information input button 81, a purchase-information display button 82, a repair-information input button 83, a repair-information display button 84, and a close button 85, has been touched by the user's operation on the touch panel 28. If not, the application waits until one of the buttons 81 through 85 is touched.

If it is found in step S24 that one of the buttons 81 through 85 has been touched, the process proceeds to step S25. In step S25, the application determines whether the pressed button is the purchase-information input button 81. If so, the process proceeds to step S26 in which the application displays a purchase-information input screen on the LCD 29. Then, a GUI, such as the one shown in FIG. 11, is displayed.

Figure 11:
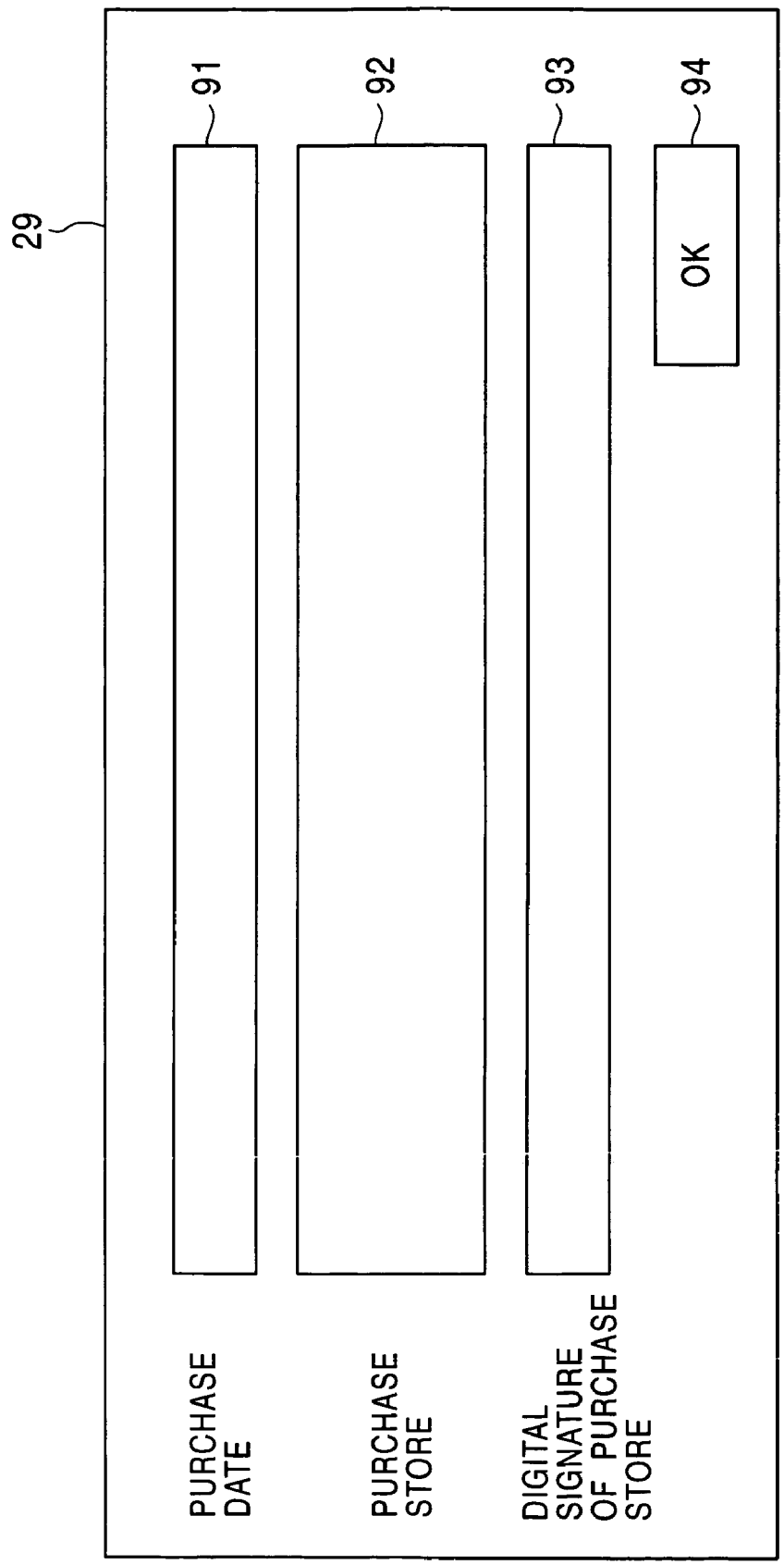
FIG. 11 illustrates a GUI displayed on the LCD 29 when a purchase-information input button 81 shown in FIG. 10 is touched.

On the GUI shown in FIG. 11, by using, for example, a keyboard displayed on the touch panel 28, a requester (for example, a salesclerk) fills the date on which the apparatus (DVCR 3) was purchased in a purchase date area 91, the name, address, and telephone number of the purchase store in a store input area 92, and a digital signature of the store in a digital-signature input area 93.

The application then determines in step S27 whether the salesclerk has filled required data in the GUI shown in FIG. 11 and has pressed an OK button 94 by operating the touch panel 28. If not, the application waits until the required data has been filled in. If it is found in step S27 that the salesclerk fills the required data and pressed the OK button 94, the process proceeds to step S28 in which the application sends a command corresponding to setInfo to the guarantee card FCM.

Figure 12:
FIG. 12 illustrates a GUI displayed on the LCD 29.

In step S29, the application receives a command response corresponding to the setInfo command sent in step S28, and determines whether the command response represents success in writing the purchase information. If so, in step S30, the application displays on the LCD 29 a message indicating that purchase information has been successfully written. Then, a GUI, such as the one shown in FIG. 12 (PURCHASE INFORMATION SUCCESSFULLY WRITTEN), is displayed.

Figure 13:
FIG. 13 illustrates another GUI displayed on the LCD 29.

If it is found in step S29 that the command response represents a failure in writing the purchase information, the process proceeds to step S31 in which the application displays on the LCD 29 a message indicating that the writing of the purchase information has failed. Then, a GUI, such as the one shown in FIG. 13 (PURCHASE INFORMATION ALREADY WRITTEN, CANNOT ACCESS), is displayed.

If it is found in step S25 that the pressed button is not the purchase-information input button 81, the process proceeds to step S32 in which the application further determines whether the pressed button is the purchase-information display button 82. If so, the process proceeds to step S33 in which the application sends a command corresponding to getInfo to the guarantee card FCM.

In step S34, the application receives a command response corresponding to the getInfo command sent to the guarantee card FCM in step S33, and extracts purchase information from the command response. Subsequently, in step S35, the application displays a purchase-information display screen on the LCD 29. Then, a GUI, such as the one shown in FIG. 14, is displayed.

Figure 14:
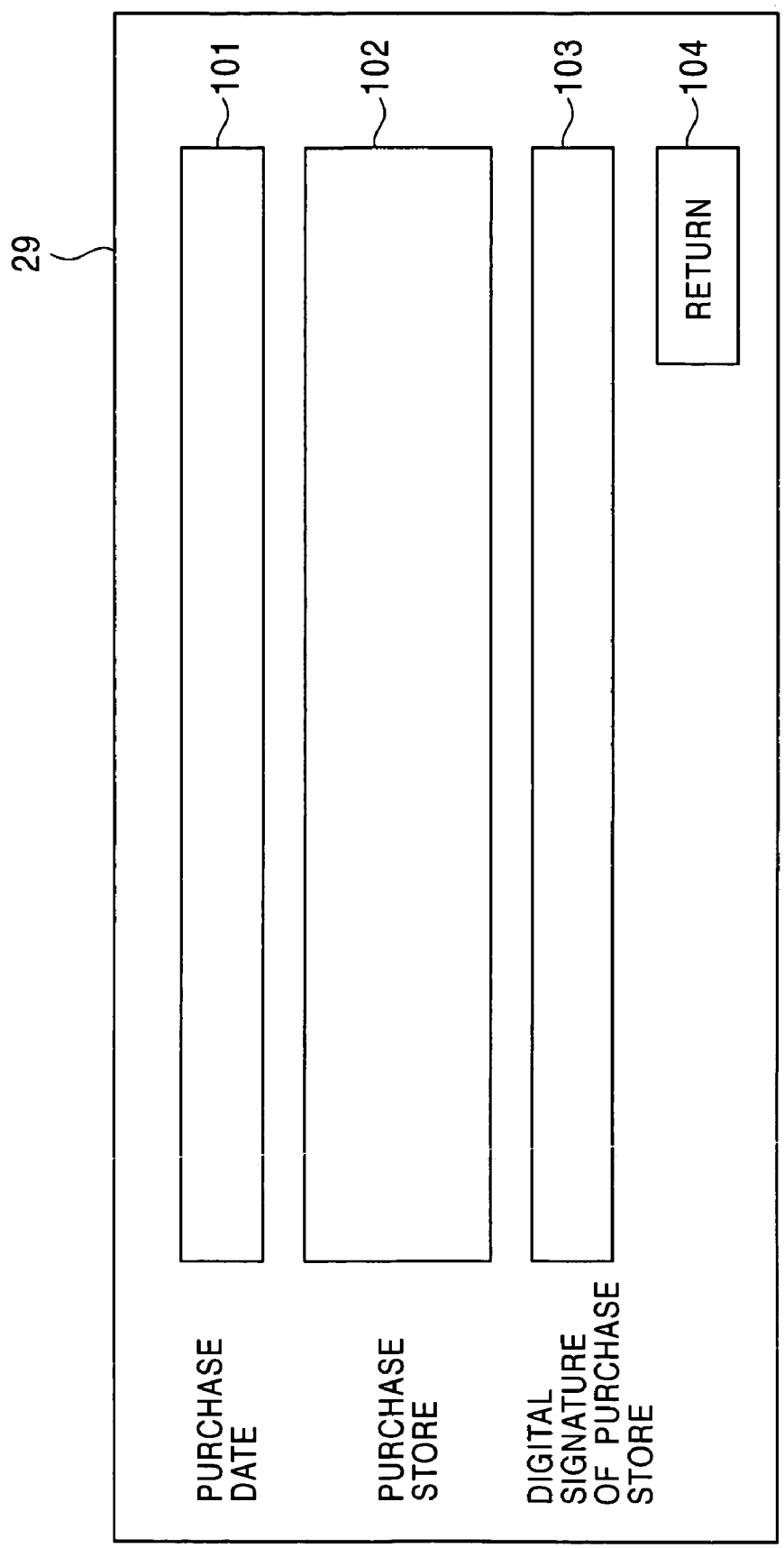
FIG. 14 illustrates a GUI displayed on the LCD 29 when a purchase-information display button 82 shown in FIG. 10 is touched.

On the GUI shown in FIG. 14, the purchase date filled in the purchase-date input area 91 (FIG. 11) is indicated in a purchase-date display area 101, the name, address, and telephone number of the purchase store filled in the store input area 92 are shown in a store display area 102, and the digital signature of the store filled in the digital-signature input area 93 is indicated in a digital-signature display area 103. The requester checks the GUI screen of the purchase information, and returns to the GUI screen shown in FIG. 10 by touching a return button 104.

If it is found in step S32 that the pressed button is not the purchase-information display button 82, the process proceeds to step S36 (FIG. 9) in which the application further determines whether the pressed button is a repair-information input button 83. If so, the process proceeds to step S37 in which the application displays a repair-information input screen on the LCD 29. Then, a GUI, such as the one shown in FIG. 15, is displayed.

Figure 15:
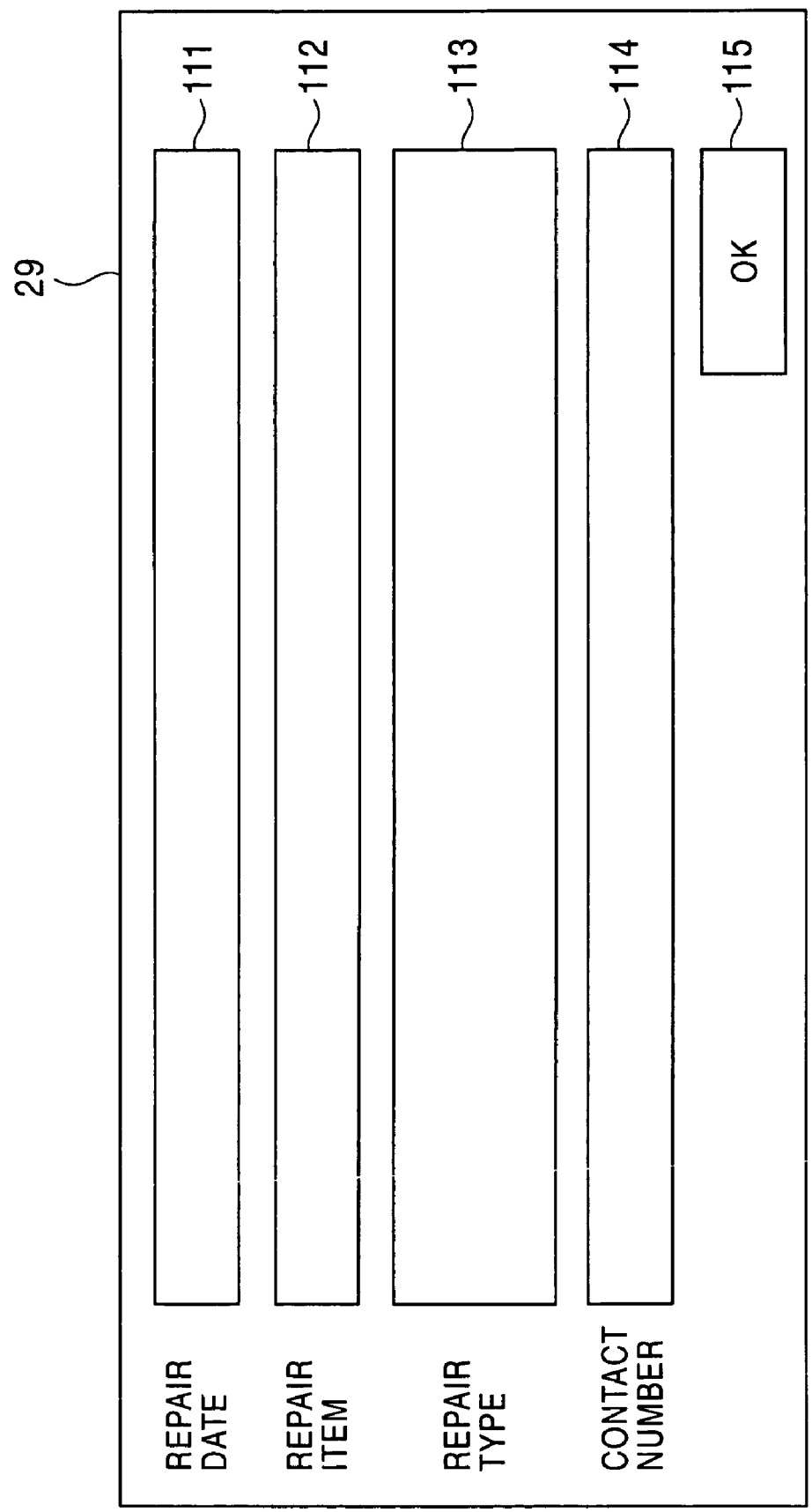
FIG. 15 illustrates a GUI displayed on the LCD 29 when a repair-information input button 83 shown in FIG. 10 is touched.

On the GUI shown in FIG. 15, by operating the touch panel 28, a requester (for example, a repair technician) fills the date on which the apparatus (DVCR 3) was repaired in a repair-date input area 111, the name of the item repaired in a repair-item input area 112, the type of repair in a repair-type input: area 113, and the contact number of the repair technician in a contact-number input area 114. For the requester to later read the past repair content, in the repair-item input area 112, the name of the repair item which is easy to search for from a repair history list (FIG. 16), which is discussed below, is input.

The application then determines in step S38 whether the required data has been filled in the GUI shown in FIG. 15 and an OK button 115 has been pressed by the user's operation on the touch panel 28. If not, the application waits until the required data is filled in by the user. If it is found in step S38 that the user has filled in the required data and pressed the OK button 115, the process proceeds to step S39. In step S39, the application sends a command corresponding to addHistory to the guarantee card FCM, and returns to step S24 and repeats the above-described processing.

If it is found in step S36 that the pressed button is not the repair-information input button 83, the process proceeds to step S40 in which the application further determines whether the pressed button is the repair-information display button 84. If so, the process proceeds to step S41 in which the application sends a command corresponding to getHistory to the guarantee card FCM.

Then, in step S42, the application receives a command response corresponding to the getHistory command transmitted to the guarantee card FCM in step S41, and extracts repair information from the response command. In step S43, the application displays a repair history list on the LCD 29. Then, a GUI, such as the one shown in FIG. 16, is displayed.

Figure 16:
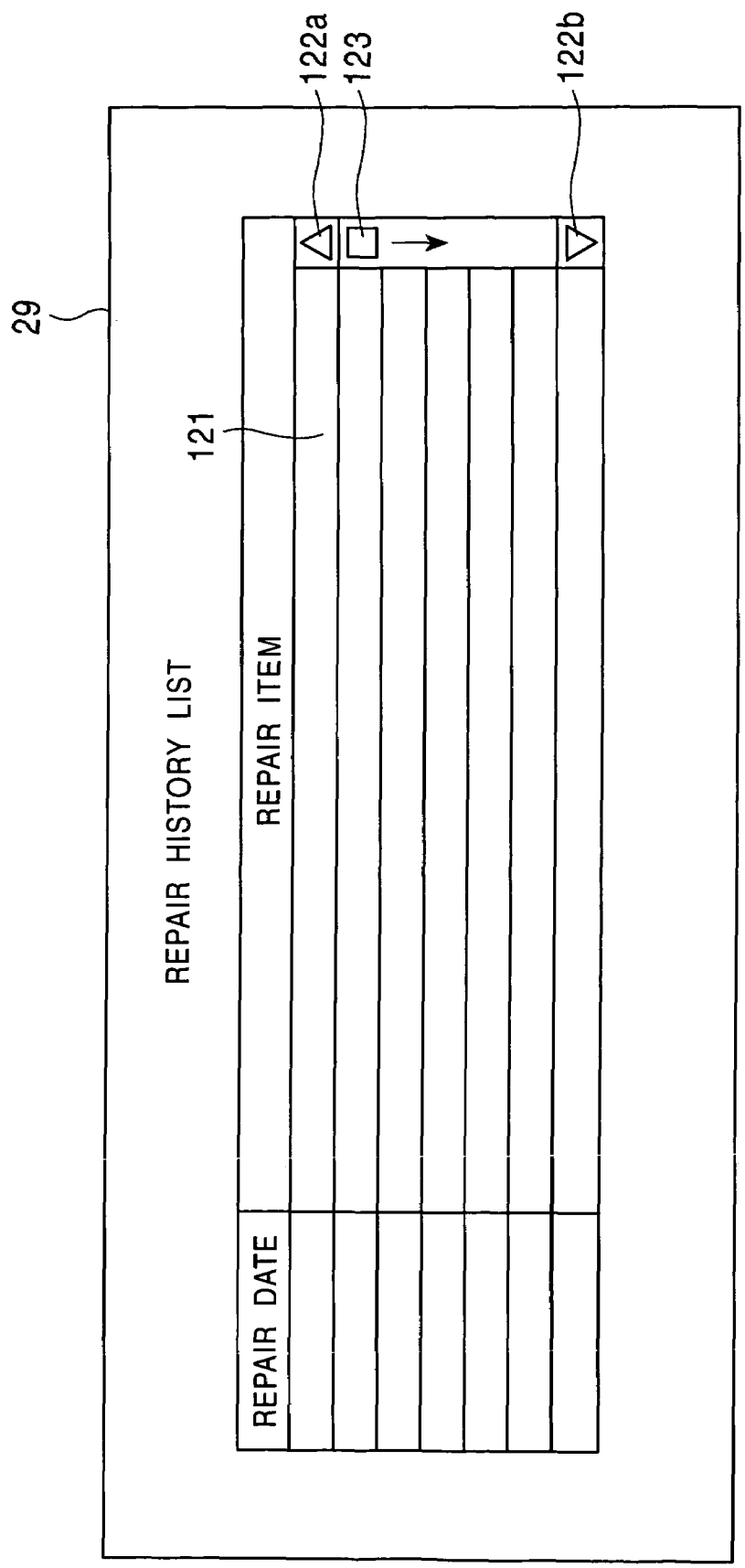
FIG. 16 illustrates a GUI displayed on the LCD 29 when a repair-information display button 84 shown in FIG. 10 is touched.

On the GUI shown in FIG. 16, the repair date and the repair item filled in the repair-date input area 111 and the repair-item input area 112 (FIG. 15), respectively, are displayed in a list box 121. When a button 122a or 122b is touched by the requester, a cursor 123 vertically moves to display another repair history. The requester touches a predetermined position (display portion) of the repair dates or the repair items displayed in the list box 121 so as to read desired repair information.

When the predetermined position of the repair dates or the repair items displayed in the list box 121 is touched by the user, in step S43, the application displays the corresponding repair information on the LCD 29. Then, a GUI, such as the one shown in FIG. 17, is displayed.

Figure 17:
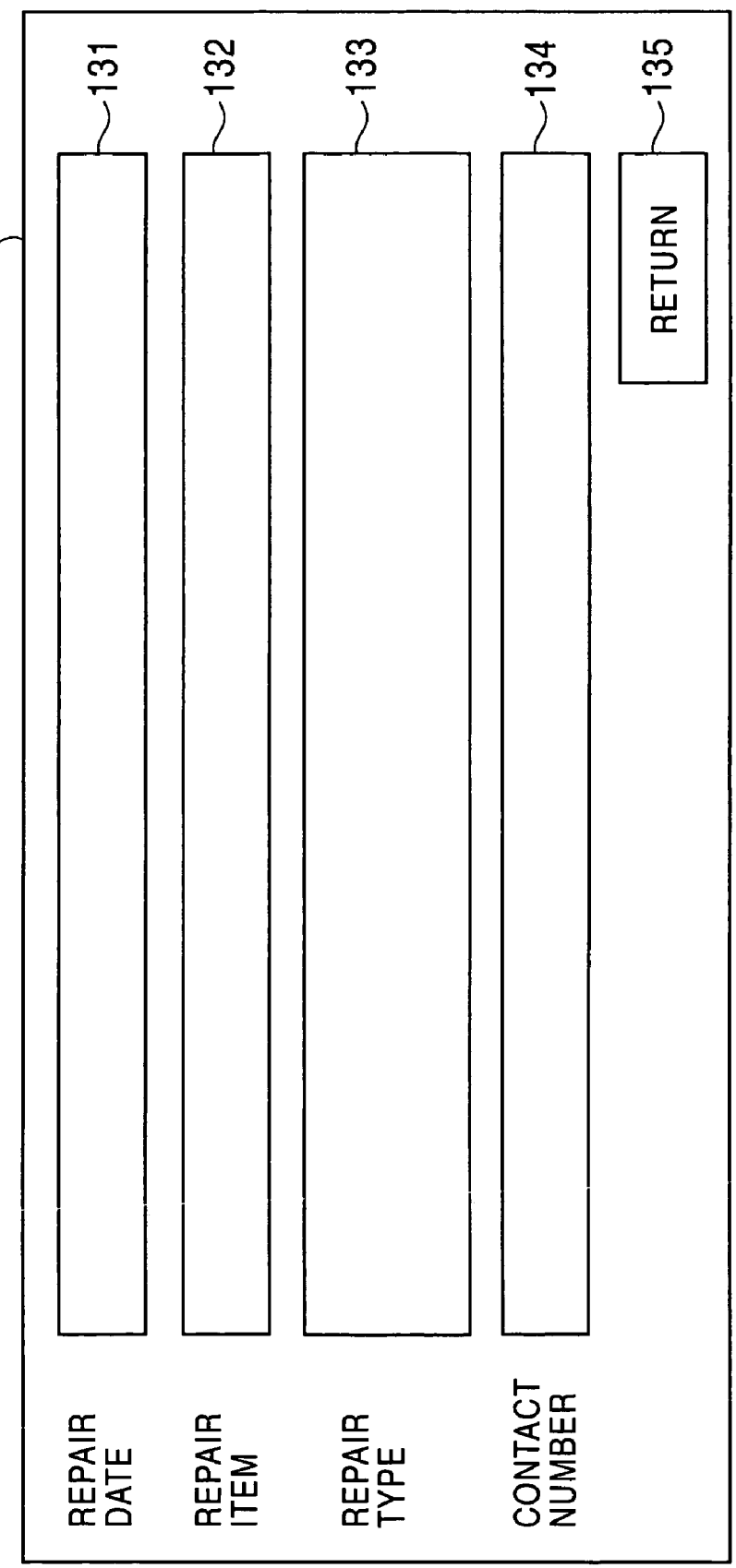
FIG. 17 illustrates a GUI displayed on the LCD 29 when a predetermined position of the GUI shown in FIG. 16 is touched.

On the GUI shown in FIG. 17, the repair date filled in the repair-date input area 111 (FIG. 15) is indicated in a repair-date display area 131, the name of the repaired item filled in the repair-item input area 112 is shown in a repair-item display area 132, the type of repair filled in the repair-type input area 113 is indicated in a repair-type display area 133, and the contact number of the repair technician filled in the contact-number input area 114 is shown in a contact-number display area 134. The requester checks the GUI screen of the repair information, and returns to the GUI screen shown in FIG. 10 by touching a return button 135.

After the repair information is displayed in step S43, by the user's operation on the return button 135, the application returns to step S24 in which the above-described processing is repeated.

If it is found in step S40 that the pressed button is not the repair-information display button 84, the process proceeds to step S44 in which the application determines that the pressed button is the close button 85, and closes the GUI screen shown in FIG. 10. Thus, the processing is completed.

As described above, by installing the guarantee card FCM of the DVCR 3 on the IRD 2, the IRD 2 is able to read the electronic guarantee card (purchase information or repair information) of the DVCR 3 via the network, and store new repair information in the repair-information storage area 72 of the non-volatile memory 55 via the network. That is, by providing a special memory for storing repair history information, the repair history can be centrally managed.

Additionally, it is not necessary for a repair technician to carry a history recording/reading device corresponding to each apparatus, or rather, it is not necessary to provide a history recording/reading device itself.

In the foregoing embodiment, the purchase information is stored in the non-rewritable purchase-information storage area 71, while the repair information is stored in the non-overwritable repair-information storage area 72, thereby enabling the user to easily manage the repair information and preventing the information from being illegally overwritten.

In the aforementioned embodiment, the application of the IRD 2 accesses the electronic guarantee card stored in the non-volatile memory 55 so as to display the information on the LCD 29 of the IRD 2. Alternatively, in the present invention, the user may input a predetermined command by using the touch panel 60 of the DVCR 3. This allows the application of the DVCR 3 to read the electronic guarantee card stored in the non-volatile memory 55 and directly display the read information on the LCD 61 of the DVCR 3.

Figure 18:
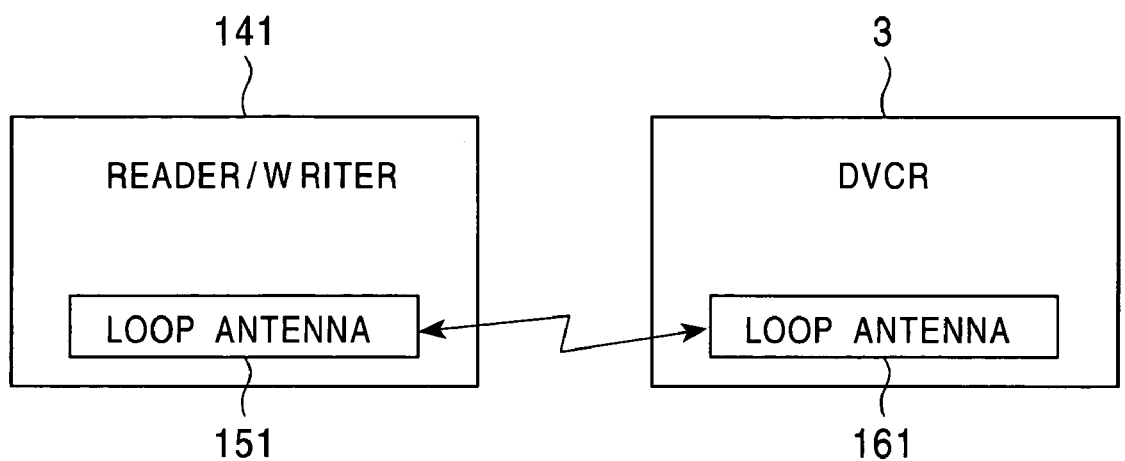
FIG. 18 is a block diagram illustrating an information processing system according to another embodiment of the present invention.

FIG. 18 illustrates an information processing system according to another embodiment of the present invention. In this system, a reader/writer 141 and the DVCR 3 perform non-contact communication.

The reader/writer 141 modulates a control signal for controlling the DVCR 3 into a signal having a predetermined format, and outputs it from a loop antenna 151 as radio waves. The loop antenna 151 receives the radio waves transmitted from the DVCR 3. The DVCR 3 demodulates radio waves received by a loop antenna 161, and writes or reads an electronic guarantee card into or from the non-volatile memory 55.

Figure 19:
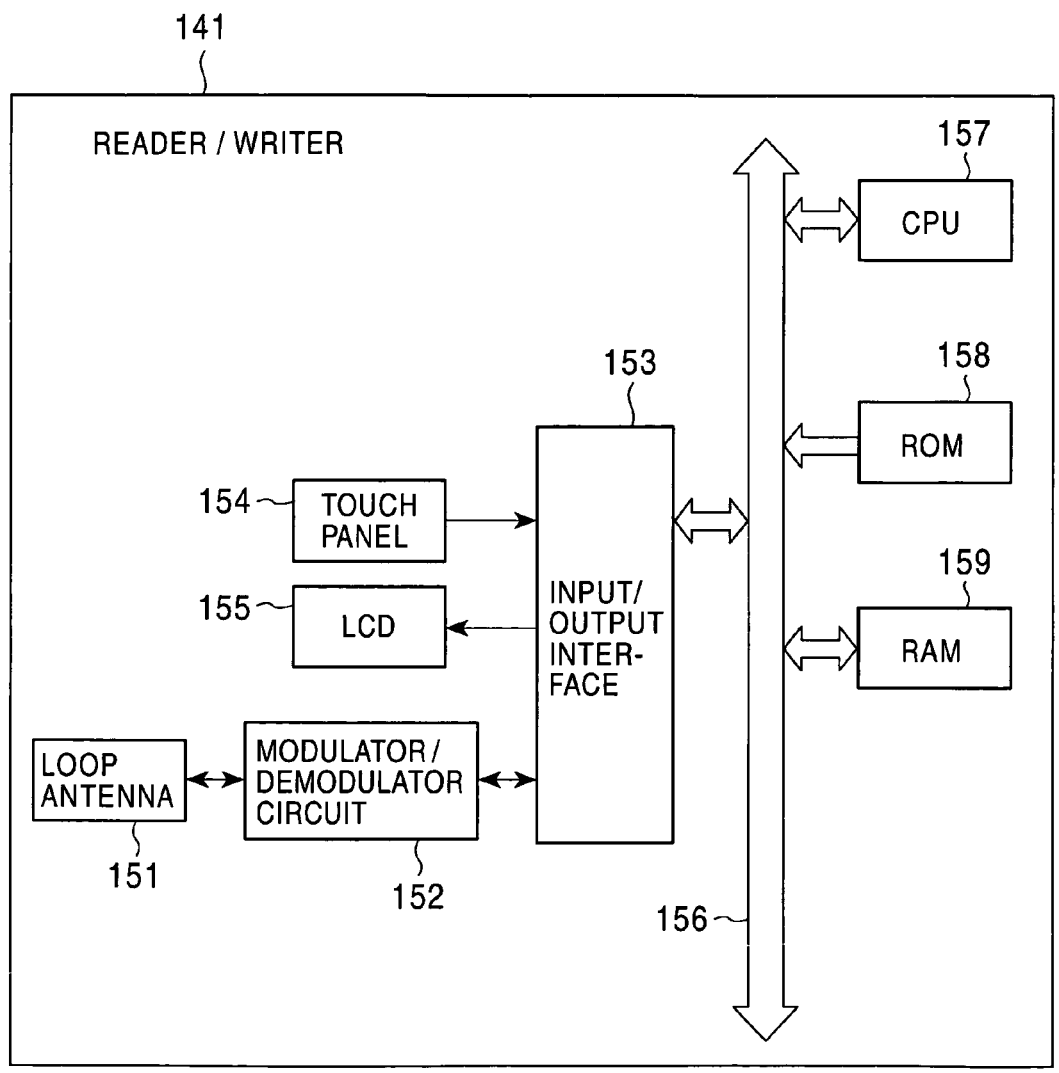
FIG. 19 is a block diagram illustrating an example of the configuration of a reader/writer shown in FIG. 18.

The reader/writer 141 may be configured, as shown in FIG. 19. When a touch panel 154 is operated by the user, the corresponding signal is input into a CPU 157 via an input/output interface 153 and an internal bus 156. In response to the received signal, the CPU 157 reads a program stored in a ROM 158, and generates a signal for controlling the DVCR 3 and outputs it to a modulator-demodulator circuit 152 via the internal bus 156 and the input/output interface 153. The modulator-demodulator circuit 152 then modulates the input control signal and supplies it to the loop antenna 151.

The loop antenna 151 radiates electromagnetic waves corresponding to the modulated signal supplied from the modulator-demodulator circuit 152 to the loop antenna 161 of the DVCR 3. The loop antenna 151 also receives electromagnetic waves radiated from the loop antenna 161 of the DVCR 3, and converts the received electromagnetic waves into an electric signal and supplies it to the modulator-demodulator circuit 152.

The modulator-demodulator circuit 152 demodulates a modulated signal supplied from the loop antenna 151, and outputs the demodulated data to the CPU 157. The CPU 157 then outputs the received data to an LCD 155 via the input/output interface 153 and displays it on the LCD 155.

A RAM 159 temporarily stores a program to be executed by the CPU 157, data created by the execution of the program, data required for executing processing by the DVCR 3, etc.

Figure 20:
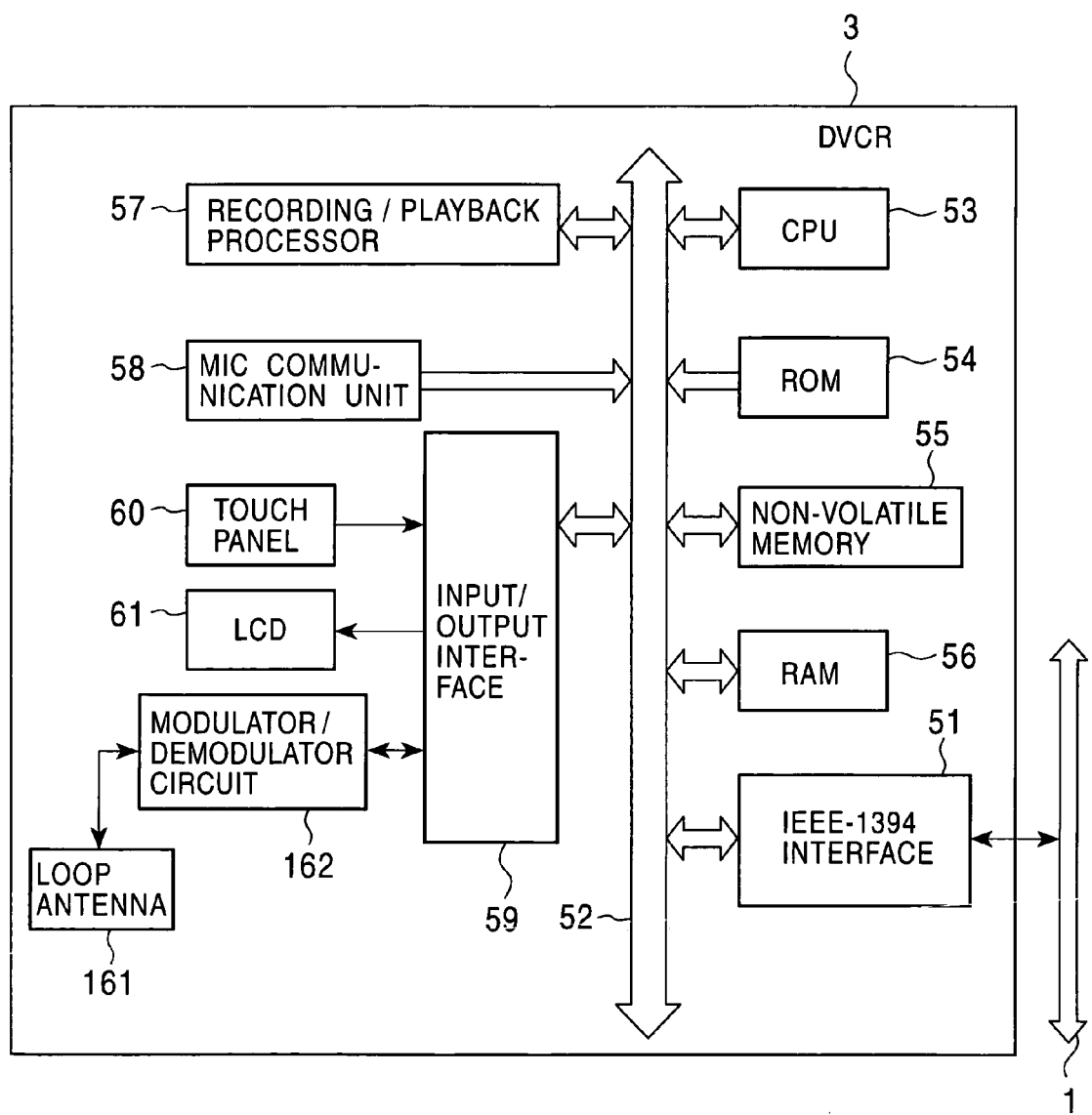
FIG. 20 is a block diagram illustrating an example of the configuration of a DVCR shown in FIG. 18.

FIG. 20 is a block diagram illustrating the configuration of the DVCR 3 shown in FIG. 18. The same elements as those shown in FIG. 3 are designated with like reference numerals, and an explanation thereof will thus be omitted. The configuration of the DVCR 3 shown in FIG. 20 is similar to that shown in FIG. 3, except that the loop antenna 161 and a modulator-demodulator circuit 162 are newly provided.

Upon receiving electromagnetic waves radiated from the loop antenna 151 of the reader/writer 141, the loop antenna 161 converts the electromagnetic waves into an electric signal and supplies it to the modulator-demodulator circuit 162. The modulator-demodulator circuit 162 demodulates the signal received from the loop antenna 161, and outputs it to the CPU 53 via the input/output interface 59 and the internal bus 52. The CPU 53 then analyzes the received signal (command) according to the program stored in the ROM 54. Based on the analysis result, the CPU 53 accesses the purchase-information storage area 71 or the repair-information storage area 72 of the non-volatile memory 55 as required, and reads or writes an electronic guarantee card. The CPU 53 also generates a response signal corresponding to the command, and supplies it to the modulator-demodulator circuit 162 via the internal bus 52 and the input/output interface 59.

With this configuration, when the loop antenna 151 provided for the reader/writer 141 is brought close to the loop antenna 161 of the DVCR 3, data can be sent and received by non-contact communication. Accordingly, in the event of a failure, a repair technician brings the reader/writer 141 close to the DVCR 3 so as to read the electronic guarantee card (purchase information or repair information) stored in the DVCR 3. The repair technician is also able to input required information (repair information) into the reader/writer 141 so as to write new repair information.

The message analyzing processing to be executed by the reader/writer 141 is similar to that performed by the guarantee card FCM discussed with reference to FIG. 7 and that performed by the application discussed with reference to FIGS. 8 and 9, and an explanation thereof will thus be omitted.

FIG. 21 is a block diagram illustrating a home network system according to still another embodiment of the present invention. In this system, the IRD 2, the DVCR 3, and a hard disk 171 are connected to the IEEE-1394 serial bus 1. The hard disk 171 is formed of a purchase-information storage area 181 and a repair-information storage area 182. The purchase-information storage area 181 stores the purchase information (purchase date, purchase store, and digital signature of the purchase store) of the DVCR 3, while the repair-information storage area 182 stores the repair information (repair date, repair type, repair technician's name, and contact number) of the DVCR 3.

By installing the guarantee card FCM from the DVCR 3, the IRD 2 is able to write an electronic guarantee card (purchase information or repair information) into the hard disk 171 and read the electronic guarantee card from the hard disk 171. In this case, the data is written and read by using IEEE-1394 asynchronous writing and IEEE-1394asynchronous reading, respectively.

In this manner, the hard disk drive 171 may be used as a backup device for the electronic guarantee card of the DVCR 3. Accordingly, even if the electronic guarantee card cannot be read from the DVCR 3 due to a failure of the DVCR 3, it can be obtained from the hard disk drive 171.

Instead of the hard disk drive 171, a mini-disc (MD) player may be connected to the IEEE-1394 serial bus 1, in which case, the electronic guarantee card of the DVCR 3 may be stored in an MD.

As described above, by integrating the guarantee card (purchase information or repair information) FCM of the DVCR 3 in advance, or newly installing it into the IRD 2, the IRD 2 is able to reliably manage the electronic guarantee card of the DVCR 3.

When a plurality of controlled apparatuses, such as DVCRs, are connected to the IEEE-1394 serial bus 1, the IRD 2 may select only a desired DVCR and store the corresponding electronic guarantee card in the hard disk drive 171 in correspondence with the ID number of the DVCR. In this case, the ID number may be a HAVi unique identifier (HUID). Then, the IRD 2 can read the electronic guarantee card of the desired DVCR from the hard disk drive 171 based on the HUID of the DVCR.

In the foregoing embodiment, the electronic guarantee card of the DVCR 3 is stored. In the present invention, however, any type of electronic apparatus may be applied as long as it can be controlled by the IRD 2.

Software for executing the above-described series of processing is installed from a recording medium into a computer which contains special hardware integrating the corresponding software program or into a computer, for example, a general-purpose computer, which executes various functions by installing various programs.

Such a recording medium may be formed of the hard disk 30 storing the program, which is integrated into the IRD 2. The recording medium may also be formed of a package medium, which is distributed to the user separately from the IRD 2, such as the magnetic disk 41 (including a floppy disc), the optical disc 42 (including compact disc-read only memory (CD-ROM) and a digital versatile disk (DVD)), the magneto-optical disk 43 (including a mini disk (MD)), or the semiconductor memory 44.

It is not essential that the steps forming the program provided by a medium be executed chronologically according to the order discussed in this specification. Alternatively, they may be executed concurrently or individually.

The term, "system", used in this specification represents the overall apparatus formed of a plurality of devices.

What is claimed is:

1. An information processing apparatus for sending and receiving an information signal to and from an electronic apparatus, comprising:

communication management means for managing a communication on a home network system, wherein said communication management means provides a transmission mechanism for sending and receiving information signals between apparatuses connected to said home network system, monitor an operation status of said home network system and provide a corresponding information to other means;

software module acquiring means for acquiring, directly from said electronic apparatus, a software module used for writing and reading product history information which includes at least one of purchase information and repair information concerning said electronic apparatus, wherein said software module acquiring means automatically acquires said software module when said communication management means detect that said electronic apparatus is connected to said home network system;

software module installing means for identifying the software module acquired by said software module acquiring means, for installing said software module on said information processing apparatus and for uninstalling said software module on said information processing apparatus, wherein said software module installing means uninstalls said software module when said communication management means detect that said electronic apparatus is pulled out of said home network system; and product-history updating means for updating the product history information stored in said electronic apparatus by sending messages for reading/writing the product history information to said electronic apparatus via said home network system and receiving responses to said messages from said electronic apparatus, with the use of said software module installed by said software installing means.

2. An information processing apparatus according to claim 1, wherein said home network system comprises an IEEE-1394 serial bus.

3. An information processing apparatus according to claim 1, further comprising product-history storage means, wherein the product history information is read from said electronic apparatus based on the software module, and is stored in said product-history storage means.

4. An information processing apparatus according to claim 3, further comprising:

apparatus-identification-number reading means for reading an apparatus identification number of said electronic apparatus from said electronic apparatus; and central storage means for centrally storing the product history information stored in said product-history storage means together with the apparatus identification number of said electronic apparatus into an external electronic apparatus.

5. An information processing apparatus according to claim 4, further comprising product-history reading means for reading the product history information of said electronic apparatus from the product history information stored in said external electronic apparatus by said central storage means based on the apparatus identification number of said electronic apparatus.

6. An information processing apparatus according to claim 1, wherein the product history information is read from said electronic apparatus based on the software module, and said product history updating means comprises product-history display means for displaying the product history information.

7. An information processing apparatus according to claim 6, wherein said product history updating means comprises product-history input means for inputting new product history information concerning said electronic apparatus from an external source based on the product history information displayed by said product-history display means.

8. An information processing apparatus according to claim 1, further comprising purchase-information determining means for determining whether the purchase information has already been written into said electronic apparatus, wherein said product-history updating means does not write new purchase information into said electronic apparatus when said purchase-information determining means determines that the purchase information has already been written.

9. An information processing apparatus according to claim 1, wherein said product-history updating means does not overwrite the repair information concerning said electronic apparatus.

10. An information processing apparatus according to claim 1, wherein the purchase information comprises at least one of the date on which said electronic apparatus was purchased, the name, the address, and the telephone number of a store at which said electronic apparatus was purchased, and a digital signature of the store.

11. An information processing apparatus according to claim 1, wherein the repair information comprises at least one of the date on which said electronic apparatus was repaired, the item and the type of repair, a contact number, the name of a repair company, and information concerning a repair person.

12. An information processing method for use in an information processing apparatus for sending and receiving an information signal to and from an electronic apparatus, said information processing method comprising:
    a communication management step for managing a communication on a home network system, wherein said communication management step provides a transmission mechanism for sending and receiving information signals between apparatuses connected to said home network system, monitors an operation status of said home network system and provides a corresponding information to other steps;
    a software acquiring step of acquiring, directly from said electronic apparatus, a software module used for writing and reading product history information which includes at least one of purchase information and repair information concerning said electronic apparatus, wherein said software module acquiring step automatically acquires said software module when said communication management step detects that said electronic apparatus is connected to said home network system;
    a software installing step of identifying the software module acquired by said software acquiring step, for installing said software module on said information processing apparatus, and for uninstalling said software module on said information processing apparatus, wherein said software module installing step uninstalls said software module when said communication management step detect that said electronic apparatus is pulled out of said home network system; and
    a product-history updating step of updating the product history information stored in said electronic apparatus by sending messages for reading/writing the product history information to said electronic apparatus via said home network system and receiving responses to said messages from said electronic apparatus, with the use of said software module installed in said software installing step.

13. A recording medium for storing a computer-readable program which controls an information processing apparatus for sending and receiving an information signal to and from an electronic apparatus, said computer-readable program comprising:
    a communication management step for managing a communication on a home network system, wherein said communication management step provides a transmission mechanism for sending and receiving information signals between apparatuses connected to said home network system, monitors an operation status of said home network system and provides a corresponding information to other steps;
    a software acquiring step of acquiring, directly from said electronic apparatus, a software module used for writing and reading product history information which includes at least one of purchase information and repair information concerning said electronic apparatus, wherein said software module acquiring step automatically acquires said software module when said communication management step detects that said electronic apparatus is connected to said home network system;
    a software installing step of identifying the software module acquired by said software acquiring step, for installing said software module on said information processing apparatus, and for uninstalling said software module on said information processing apparatus, wherein said software module installing step uninstalls said software module when said communication management step detects that said electronic apparatus is pulled out of said home network system; and
    a product-history updating step of updating the product history information stored in said electronic apparatus by sending messages for reading/writing the product history information to said electronic apparatus via said home network system and receiving responses to said messages from said electronic apparatus, with the use of said software module installed by said software installing step.

14. An information processing apparatus for sending and receiving an information signal to and from an external information processing apparatus in a home network system, said information processing apparatus comprising:
    software module storage means for storing a software module used for writing and reading product history information which includes at least one of purchase information and repair information concerning said information processing apparatus;

product-history storage means for storing the product history information to be updated without requiring a user input, by an instruction from said external information processing apparatus; and software module sending means for sending automatically from said information processing apparatus the software module stored in said software module storage means to said external information processing apparatus in response to a request from said external information processing apparatus.

15. An information processing apparatus according to claim 14, wherein said home network system comprises an IEEE-1394 serial bus.

16. An information processing apparatus according to claim 14, further comprising apparatus-identification-number storage means for storing an apparatus identification number of said information processing apparatus, wherein, in response to an instruction from said external information processing apparatus, the apparatus identification number is read from said apparatus-identification-number storage means, and the product history information is read from said product-history storage means.

17. An information processing apparatus according to claim 14, further comprising product-history display means for displaying the product history information stored in said product-history storage means.

18. An information processing apparatus according to claim 14, wherein the purchase information comprises at least one of the date on which said information processing apparatus was purchased, the name, the address, and the telephone number of a store at which said information processing apparatus was, purchased, and a digital signature of the store.

19. An information processing apparatus according to claim 14, wherein the repair information comprises at least one of the date on which said information processing apparatus was repaired, the item and the type of repair, a contact number, the name of a repair company, and information concerning a repair person.

20. An information processing method for use in an information processing apparatus for sending and receiving an information signal to and from an external information processing apparatus, said information processing method comprising:

a software module storage step of storing a software module used for writing and reading product history information which includes at least one of purchase information and repair information concerning said information processing apparatus, wherein the software module is stored when the information processing apparatus is connected to a home network system and the software module is uninstalled when the information processing apparatus in disconnected from the home network system;

product-history storage step of storing the product history information to be updated by an instruction from said external information processing apparatus; and a software module sending step of automatically sending from said information processing apparatus the software module stored in said software module storage step to said external information processing apparatus in response to a request from said external information processing apparatus.

21. A recording medium for storing a computer-readable program which controls an information processing apparatus for sending and receiving an information signal to and from an external information processing apparatus, said computer-readable program comprising:

a software module storage step of storing a software module used for writing and reading product history information which includes at least one of purchase information and repair information concerning said information processing apparatus, wherein the software module is stored when the information processing apparatus is connected to a home network system and the software module is uninstalled when the information processing apparatus is disconnected from the home network system;

product-history storage step of storing the product history information to be updated by an instruction from said external information processing apparatus; and a software module sending step of automatically sending from said information processing apparatus the software module stored in said software module storage step to said external information processing apparatus in response to a request from said external information processing apparatus.

22. An information processing apparatus according to claim 1, including stream management means for managing stream data and network resources, and for providing a network status.

23. An information processing apparatus according to claim 1, including resource management means for managing device use rights.

24. An information processing apparatus according to claim 14, including stream management means for managing stream data and network resources, and for providing a network status.

25. An information processing apparatus according to claim 14, including resource management means for managing device use rights.

* * * * *